(12) United States Patent
Bleifuss et al.

(10) Patent No.: US 8,021,460 B2
(45) Date of Patent: Sep. 20, 2011

(54) SYSTEM AND METHOD FOR PRODUCING METALLIC IRON NODULES

(75) Inventors: Rodney L. Bleifuss, Grand Rapids, MN (US); David J. Englund, Bovey, MN (US); Iwao Iwasaki, Grand Rapids, MN (US); Andrew J. Lindgren, Grand Rapids, MN (US); Richard F. Kiesel, Hibbing, MN (US)

(73) Assignee: Nu-Iron Technology, LLC, Charlotte, NC (US)

( * ) Notice: Subject to any disclaimer, the term of this patent is extended or adjusted under 35 U.S.C. 154(b) by 85 days.

(21) Appl. No.: 12/569,176

(22) Filed: Sep. 29, 2009

(65) Prior Publication Data
US 2010/0107818 A1 May 6, 2010

Related U.S. Application Data

(63) Continuation-in-part of application No. 12/359,729, filed on Jan. 26, 2009, which is a continuation of application No. PCT/US2007/074471, filed on Jul. 26, 2007.

(60) Provisional application No. 60/820,366, filed on Jul. 26, 2006.

(51) Int. Cl.
*C21B 11/08* (2006.01)
(52) U.S. Cl. .......................................... 75/484; 75/504
(58) Field of Classification Search .................... 75/484, 75/436, 485, 503, 504
See application file for complete search history.

(56) References Cited

U.S. PATENT DOCUMENTS

| | | | |
|---|---|---|---|
| 1,065,890 A | 6/1913 | Sieurin | |
| 1,868,952 A | 7/1932 | Simpson | |
| 1,885,381 A | 11/1932 | Simpson | |
| 2,072,072 A | 2/1937 | Hartgen | |
| 2,674,531 A | 4/1954 | Udy | |
| 2,793,109 A | 5/1957 | Huebler et al. | |

(Continued)

FOREIGN PATENT DOCUMENTS
EP 1405925 4/2004
(Continued)

OTHER PUBLICATIONS

Steel Times, "The Comet Process—DRI from fines and coal", Nov. 1996, p. 399.

*Primary Examiner* — George Wyszomierski
*Assistant Examiner* — Tima M McGuthry-Banks
(74) *Attorney, Agent, or Firm* — Hahn, Loeser & Parks LLP; Arland T. Stein

(57) ABSTRACT

A method for producing metallic iron nodules by assembling a shielding entry system to introduce coarse carbonaceous material greater than 6 mesh in to the furnace atmosphere at location(s) where the temperature of the furnace atmosphere adjacent at least partially reduced reducible iron bearing material is between about 2200 and 2650° F. (1200 and 1450° C.), the shielding entry system adapted to inhibit emission of infrared radiation from the furnace atmosphere and seal the furnace atmosphere from exterior atmosphere while introducing coarse carbonaceous material greater than 6 mesh into the furnace to be distributed over the at least partially reduced reducible iron bearing material, and heating the covered at least partially reduced reducible iron bearing material in a fusion atmosphere to assist in fusion and inhibit reoxidation of the reduced material during fusion to assist in fusion and inhibit reoxidation of the reduced material in forming metallic iron nodules.

47 Claims, 12 Drawing Sheets

U.S. PATENT DOCUMENTS

| | | | |
|---|---|---|---|
| 3,443,931 | A | 5/1969 | Beggs et al. |
| 3,452,972 | A | 7/1969 | Beggs |
| 3,770,417 | A | 11/1973 | Kranz |
| 4,436,551 | A | 3/1984 | Mori |
| 4,676,741 | A | 6/1987 | Pargeter |
| 4,701,214 | A | 10/1987 | Kaneko et al. |
| 5,186,741 | A | 2/1993 | Kotraba et al. |
| 5,316,471 | A | 5/1994 | Nell |
| 5,567,224 | A | 10/1996 | Kundrat |
| 5,601,631 | A | 2/1997 | Rinker et al. |
| 5,637,133 | A | 6/1997 | Munnix et al. |
| 5,730,775 | A | 3/1998 | Meissner et al. |
| 5,899,689 | A | 5/1999 | Fontana |
| 6,015,527 | A | 1/2000 | Kamei et al. |
| 6,036,744 | A | 3/2000 | Negami et al. |
| 6,270,552 | B1 | 8/2001 | Takeda et al. |
| 6,284,017 | B1 | 9/2001 | Kamei et al. |
| 6,368,104 | B1 | 4/2002 | Saxena et al. |
| 6,413,295 | B2 | 7/2002 | Meissner et al. |
| 6,494,933 | B1 | 12/2002 | Saage et al. |
| 6,630,010 | B2 | 10/2003 | Ito et al. |
| 6,652,802 | B2 | 11/2003 | Sherwood |
| 6,749,664 | B1 * | 6/2004 | Hoffman et al. ............... 75/484 |
| 7,632,335 | B2 * | 12/2009 | Iwasaki et al. ............... 75/485 |
| 2001/0052273 | A1 | 12/2001 | Meissner et al. |
| 2003/0047038 | A1 | 3/2003 | Iwasaki et al. |
| 2006/0150774 | A1 | 7/2006 | Iwasaki et al. |
| 2009/0175753 | A1 * | 7/2009 | Iwasaki et al. ............... 420/8 |

FOREIGN PATENT DOCUMENTS

| | | |
|---|---|---|
| EP | 1605067 | 12/2005 |
| EP | 1405924 | 8/2007 |
| GB | 642339 A | 8/1956 |
| JP | 11050119 A | 2/1999 |
| KR | 10-1989-0002217 | 6/1989 |
| KR | 10-2000-0056944 | 9/2000 |
| KR | 10-2002-0019957 | 3/2002 |
| WO | 2004-083463 | 9/2004 |
| WO | 2006-061790 | 6/2006 |

* cited by examiner

|  | SiO$_2$ | Al$_2$O$_3$ | CaO | MgO | Fe | S | LOI |
|---|---|---|---|---|---|---|---|
| Al(OH)$_3$ I | --- | 29.94 | --- | --- | --- | --- | --- |
| Al(OH)$_3$ II | --- | 55.90 | --- | --- | --- | --- | --- |
| Bauxite | 2.53 | 57.35 | 0.09 | 0.04 | 7.2 | --- | --- |
| Bentonite | 63.46 | 25.70 | 4.53 | 1.40 | 2.26 | --- | --- |
| Ca(OH)$_2$ | --- | --- | 75.7 | --- | --- | --- | --- |
| Lime hydrate | 0.71 | 0.65 | 76.67 | 1.12 | --- | --- | 30.84 |
| Limestone | 0.70 | 0.27 | 47.90 | 0.95 | 0.10 | --- | 43.99 |
| Portland cement | 19.61 | 4.63 | 66.65 | 3.32 | 1.77 | 0.90 | --- |

Fig. 7

SYSTEM AND METHOD FOR PRODUCING METALLIC IRON NODULES

CROSS-REFERENCE TO RELATED APPLICATIONS

This application is a continuation-in-part of U.S. patent application Ser. No. 12/359,729, filed Jan. 26, 2009, which is a continuation of International Patent Application PCT/US2007/074471, filed on Jul. 26, 2007, which claims priority from U.S. Patent Application No. 60/820,366, filed Jul. 26, 2006.

STATEMENT REGARDING FEDERALLY SPONSORED RESEARCH

The present invention was made with support by the Department of Energy, Sponsor Award DE-FG36-05GO15185, and with support by the Economic Development Administration, Grant No. 06-69-04501. The United States government may have certain rights in the invention.

BACKGROUND AND SUMMARY

The present invention relates to reduction of iron bearing materials such as iron ore to metallic iron nodules (known as "NRI").

Metallic iron has been produced by reducing iron oxide such as iron ores, iron pellets, and other iron sources. Various such methods have been proposed so far for directly producing metallic iron from iron ores or iron oxide pellets by using with reducing agents such as coal or other carbonaceous material. Such fusion reduction processes generally involve the following processing steps: feed preparation, drying, preheating, reduction, fusion/melting, cooling, product discharge, and metallic iron/slag product separation. These processes result in direct reduction of iron bearing material to metallic iron nodules (NRI) and slag. Metallic iron nodules produced by these direct reduction processes are characterized by near total reduction, approaching 100% metal (e.g., about 96% or more metallic Fe). Percents (%) herein are percents by weight unless otherwise stated.

Unlike conventional direct reduced iron (DRI) product, the metallic iron nodule (NRI) product has little or no gangue and little or no porosity. NRI is essentially metallic iron product desirable for many applications, such as use in place of scrap in steelmaking by electric arc furnaces. Such metallic iron nodules may be made by processing beneficiated taconite iron ore, which may contain 30% oxygen and 5% gangue. In addition to advantages of the NRI product, there is less bulk to transport than with beneficiated taconite pellets or DRI, as well as a lower rate of oxidation and a lower porosity than DRI. In addition, generally, such metallic iron nodules are just as easy to handle as taconite pellets and DRI. Moreover, NRI is a more efficient and effective substitute for scrap in steel making by electric arc furnace (EAF) without extending heat times and increasing energy cost in making steel.

Various types of hearth furnaces have been described and used for direct reduction of metallic iron nodules (NRI). One type of hearth furnace used to make NRI is a rotary hearth furnace (RHF). The rotary hearth furnace is partitioned annularly into a drying/preheating zone, a reduction zone, a fusion zone, and a cooling zone, between the supply location and the discharge location of the furnace. An annular hearth is supported rotationally in the furnace to move from zone to zone carrying reducible material the successive zones. In operation, the reducible material comprises a mixture of iron ore or other iron oxide source and reducing material such as carbonaceous material, which is charged onto the annular hearth and initially subject to the drying/preheat zone. After drying and preheating, the reducible material is moved by the rotating annular hearth to the reduction zone where the iron ore is reduced in the presence of the reducing material, and then to the fusion zone where the reduced reducible material is fused into metallic iron nodules, using one or more heating sources (e.g., natural gas burners). The reduced and fused NRI product, after completion of the reduction process, is cooled on the moving annular hearth in the cooling zone to prevent reoxidation and facilitate discharge from the furnace. Another type of furnace used for making NRI is the linear hearth furnace such as described in U.S. Pat. No. 7,413,592, where similarly prepared mixtures of reducible material are moved on moving hearth sections or cars through a drying/preheating zone, a reduction zone, a fusion zone, and a cooling zone, between the charging end and discharging end of a linear furnace while being heated above the melting point of iron.

A problem in the production of NRI has been the decarburization and reoxidation of iron during and after the fusion of reduced iron reducible material into metallic iron. Oxygen present in the fusion zone may combine with carbon and iron on the surface of the metallic iron nodules forming CO and FeO. Various solutions have been presented to overcome this problem such described in Moon and Sahajwalla, "*Investigation into the Role of the Boudouard Reaction in Self-Reducing Iron Oxide and Carbon Briquettes*," Metallurgical and Materials Transactions, Vol. 37B at 215 (April 2006).

We have found that providing a coarse carbonaceous overlayer over the reducible material results in higher efficiency reduction of the reducible material to metallic iron nodules, and a markedly lower percent of the sulfur in the metallic iron nodules. Additionally, we have found providing the coarse carbonaceous overlayer reduced the formation of micro-nuggets (small metallic iron nodules having a size between about 20 mesh and about 3 mesh). However, adding the coarse overlayer prior to the preheat zone means the coarse overlayer is heated and partially consumed in the drying zone and reduction zone. We have also found a method of producing metallic iron nodules with more effective and efficient use of the coarse overlayer by introduction into the furnace near or in the fusion zone avoiding reduction and consumption of the coarse overlayer material in the drying and reduction zone. We have also found that this method results in more efficient and effective fusion of the metallic iron nodules with less fuel consumption and without loss of iron units to slag and unreduced reducible material.

A method for producing metallic iron nodules is disclosed comprising the steps of:
  providing a hearth material layer comprising at least carbonaceous material on a refractory hearth in a traveling hearth furnace,
  providing at least one layer of reducible material comprising at least reducing material and reducible iron bearing material arranged in a plurality of discrete compacts over at least a portion of the hearth material layer,
  heating the reducible material in a drying/heating atmosphere and then in a reducing atmosphere to at least partially reduce the reducible iron bearing material,
  assembling a shielding entry system to introduce coarse carbonaceous material greater than 6 mesh in particle size into the furnace atmosphere in at least one location such that the temperature of the furnace atmosphere adjacent the at least partially reduced reducible iron bearing material is between about 2200 and 2650° F. (1200 to 1455° C.), the shielding entry system adapted to inhibit emission of infrared radiation from the furnace atmosphere and seal the furnace atmosphere from exterior atmosphere while introducing coarse carbonaceous material greater than 6 mesh into the furnace to be distributed over the at least partially reduced reducible iron bearing material, introducing a coarse carbonaceous material of greater than 6 mesh in particle size through the shielding entry system into the upper portion of the furnace, and heating the at least partially reduced reducible iron bearing material in a fusion atmosphere to form from the at least partially reduced reducible iron bearing material by fusing one or more metallic iron nodules and slag with the coarse carbonaceous material to assist in fusion and inhibit reoxidation of the reduced material during fusion.

The compacts may be preformed in briquettes, balls, pellets other form or formed in situ as described in U.S. Patent Publication 2006/0150774 (now allowed), with or without a binder. The coarse carbonaceous material may be selected from the group consisting of anthracite coal, bituminous coal, PRB coal, coke, char, and mixtures of two or more thereof. The coarse carbonaceous material introduced into the furnace atmosphere may have a particle size between 6 mesh and ½ inch or between 4 mesh and ½ inch.

The carbonaceous material may be introduced at a temperature between about 2300° F. and 2500° F. (1260 and 1370° C.). The coarse material may be introduced in the upper part of the furnace and distributed over the reducible material, or guided to within 6 inches or less and distributed over the heated reducible material. The carbonaceous material may be introduced as a layer over the at least partially reduced reducible iron bearing material. Alternatively or in addition, the coarse carbonaceous material may introduced at a rate corresponding to between about 0.25 lb./ft$^2$ (1.22 kg/m$^2$) and about 1.25 lb./ft$^2$ (6.10 kg/m$^2$), and/or coverage of the coarse carbonaceous material is between about 0.25 lb./ft$^2$ (1.22 kg/m$^2$) and about 1.25 lb./ft$^2$ (6.10 kg/m$^2$). In particular, the coarse carbonaceous material may be PRB coal introduced at a rate corresponding to between about 0.5 lb./ft$^2$ (2.44 kg/m$^2$) and about 1.25 lb./ft$^2$ (6.10 kg/m$^2$).

The shielding entry system may be assembled with at least one stepped labyrinth no more than 6 inches wide in the direction of movement of the at least partially reduced reducible iron bearing material through the furnace such that the emission of infrared radiation from the furnace atmosphere is inhibited. Alternatively or in addition, the shielding entry system may be a pellet ladder no more than 2 inches wide in the direction of movement of the at least partially reduced the reducible iron bearing material through the furnace to inhibit emission of infrared radiation from the furnace atmosphere. The shielding entry system may also seal the furnace atmosphere from the exterior atmosphere (with some leakage tolerated according to commercial efficiency).

The assembled shielding entry system may be slanted to delivery of the coarse carbonaceous material over the at least partially reduced reducible iron bearing material in the direction of flow of atmosphere through the furnace. Alternative or in addition, the assembled shielding entry system is slanted to delivery of coarse carbonaceous material over the at least partially reduced reducible iron bearing material in the direction thereof through the furnace.

Further, the shielding entry system may be assembled to permit introduction coarse carbonaceous material greater than 6 or 4 mesh in particle size at multiple locations where furnace atmosphere is between about 2200 and 2650° F. (1200 and 1450° C.) at each location, such that the shielding entry system inhibits emission of infrared radiation from the furnace atmosphere at each such location, and the coarse carbonaceous material of greater than 6 or 4 mesh in particle size is introduced into the furnace atmosphere through the shielding entry system into the upper portion of the furnace at more than one location along the furnace.

In any event, the shielding entry system may comprise sealing portions of the shielding entry system against substantial egress of furnace atmosphere. The assembled shielding entry system may comprise a feed mechanism adapted to enable controlled distribution of the coarse carbonaceous material across the width of the at least partially reduced the reducible iron bearing material.

The method may further include the step of introducing a carrier gas in the shielding entry system to inhibit oxidation of the coarse carbonaceous material therein. This addition step may further include elutriating in the shielding entry system carbonaceous material with a gas selected from the group consisting of nitrogen, carbon dioxide, carbon monoxide, recycled furnace gas, and mixtures thereof. An amount of oxygen may also be introduced with the carrier gas less than the stoichiometric amount for oxidation of the coarse carbonaceous material.

A method of producing metallic iron nodules is disclosed comprising the steps of:

providing a hearth material layer comprising at least carbonaceous material on a refractory hearth in a traveling hearth furnace, providing at least one layer of reducible material comprising at least reducing material and reducible iron bearing material arranged in a plurality of discrete compacts over at least a portion of the hearth material layer, heating the reducible material in a drying/heating atmosphere, then in a reducing atmosphere to at least partially reduce the reducible iron bearing material, and then in a fusion atmosphere to form by fusion one or more metallic iron nodules and slag, assembling a shielding entry system to introduce into the furnace atmosphere adjacent introduction of the reducible material at a temperature between about 2200 and 2650° F. (1200 and 1450° C.) while inhibiting emission of infrared radiation from the furnace atmosphere, shielding entry system adapted to seal the furnace atmosphere from the exterior atmosphere and guide coarse carbonaceous material having a particle size greater than 6 mesh or 4 mesh to within about six (6) inches of the heated reducible material and distribute the coarse carbonaceous material over the heated reducible material in the furnace, and introducing a coarse carbonaceous material having particle size greater than 6 mesh or 4 mesh through the shielding entry system over the heated reducible material to assist in fusion and inhibit reoxidation of the reduced material during fusion in forming metallic iron nodules.

The coarse carbonaceous material may be selected from the group consisting of anthracite coal, bituminous coal, sub-bituminous coal, PRB coal, coke, char, and mixtures of two or more thereof. The coarse carbonaceous material introduced into the furnace atmosphere may have a particle size between 6 mesh and ½ inch or between 4 mesh and ½ inch. For example, the coarse carbonaceous material may be coal and introduced as a layer over the heated reducible material. In some embodiments of the method, introduction and/or coverage of the coarse carbonaceous material may be between about 0.25 lb./ft$^2$ (1.22 kg/m$^2$) and about 1.25 lb./ft$^2$ (6.10 kg/m$^2$). Alternatively, the introduction and/or coverage of the coarse carbonaceous material may be between about 0.25 lb./ft$^2$ (1.22 kg/m$^2$) and about 0.75 lb./ft$^2$ (3.66 kg/m$^2$). The overlayer may include coarse carbonaceous material containing volatiles in desired amount to enhance fusion and slag separation and provide additional thermal energy to the fusion zone.

In the method for producing metallic iron nodules, the step of assembling the shielding entry system may include the shielding entry system provided with a stepped labyrinth no more than 2 inches wide in the direction of movement of the heated reducible material through the furnace. More particularly, the shielding entry system may be a pellet ladder. In addition, the step of assembling a shielding entry system into the furnace may include assembling the shielding entry system adapted to guide the coarse carbonaceous material to within about three (3) inches of the heated reducible material. In alternative or in addition, the step of assembling the shielding entry system may include the shielding entry system being roof or wall lances, or both. The shielding entry system may be substantially vertical or alternatively, may be slanted to deliver the coarse carbonaceous material distributed over the at least partially reduced reducible iron bearing material in the direction of movement of the hearth and/or the furnace gases through the furnace.

The step of assembling a shielding entry system may involve sealing the fusion atmosphere from the exterior atmosphere with some leakage tolerated for commercial efficiency. In addition, the step of assembling a shielding entry system may include delivering downwardly an inert gas in the shielding entry system to inhibit oxidation of the carbonaceous material.

The shielding entry system may be adapted to providing a substantially uniform distribution of carbonaceous material across the width of the reducible material. The method for producing metallic iron nodules further may comprise elutriating carbonaceous material with a carrier gas selected from the group consisting of nitrogen, carbon dioxide, carbon monoxide, recycled furnace gas, and mixtures thereof. The gas may be selected such that oxygen in the gas is less than the stoichiometric amount needed for oxidation of the carbonaceous material.

The method of producing metallic iron may include providing a hearth material layer comprising a plurality of carbonaceous material layers on the moving refractory hearth traveling through hearth furnace, with the hearth material layer comprising a layer of undevolatized (e.g., fresh) coal and a layer of devolatilized carbonaceous material over the undevolatized coal. The undevolatized coal in the hearth material layer may be selected from the group consisting of anthracite coal, bituminous coal, sub-bituminous coal, and mixtures thereof. The devolatilized carbonaceous material in the hearth material layer may be char or coke. The devolatilized carbonaceous material in the hearth material layer may be carbonaceous material remains removed from the hearth at the exit end of the furnace (with or without the ash from NRI formation).

The steps of the method for producing metallic iron nodules may be performed in a linear hearth furnace. Alternatively, the steps of the method for producing metallic iron nodules are performed in a rotary hearth furnace.

BRIEF DESCRIPTION OF THE DRAWINGS

The following detailed description of embodiments of the present method can be best understood when read in conjunction with the following drawings, where like structure is indicated with like reference numerals and in which:

FIG. 7 shows a table giving chemical compositions of one or more additives that may be used in one or more embodiments of the metallic iron nodule process described generally in FIG. 1, and/or for use in other processes that form metallic iron nodules;

DETAILED DESCRIPTION OF THE DRAWINGS

In FIGS. 1-10, certain embodiments of the present method and system for producing metallic iron nodules are described in further detail illustrating the features providing the resulting benefits.

The present process for production of metallic iron nodules may include steps of providing a hearth material layer 44 comprising at least carbonaceous material on a refractory hearth 42 in a traveling hearth furnace 34, providing at least one layer of reducible material 46 comprising reducing material and reducible iron bearing material arranged in a plurality of discrete compacts over at least a portion of the hearth material layer 44, and heating the reducible material 46 in a drying/preheating atmosphere, then in a reducing atmosphere to at least partially reduce the reducible iron bearing material, and then in a fusion atmosphere to form by fusion one or more metallic iron nodules and slag, as discussed below.

Figure 1:
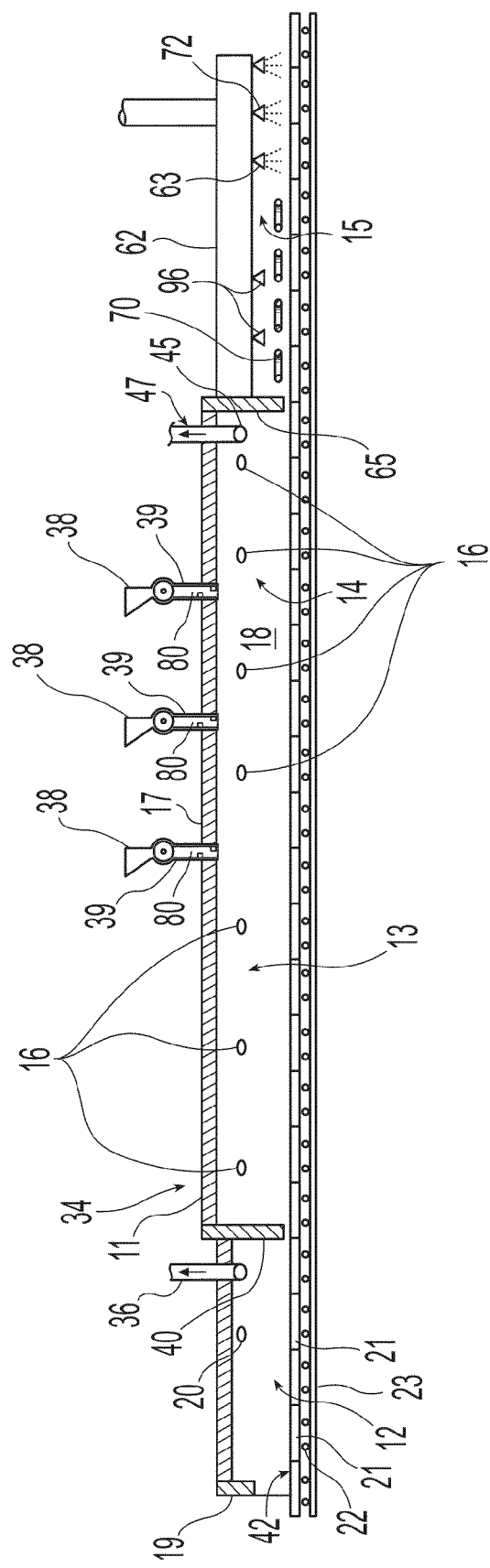
FIG. 1 is a cross sectional diagrammatical view showing a hearth furnace for producing metallic iron material and a method for producing same.

Referring now to FIGS. 1 through 6, a hearth furnace 34 for producing metallic iron material directly from iron ore and other iron oxide sources is shown. The furnace 34 has a furnace housing 11 having a furnace roof 17 and side walls 18 internally lined with a refractory material suitable to withstand the temperatures involved in the metallic reduction process carried out in the furnace, and a hearth 42. The hearth 42 may be any moving hearth suitable for use with the hearth furnace 34 operable for production of metallic iron nodules 63. Generally, the hearth 42 includes refractory material upon which reducible material to be processed (e.g., feed material) is received. The hearth 42 may be a hearth suitable for use in a rotary hearth furnace, a linear hearth furnace (e.g., as shown in FIG. 1), or any other furnace system operable for production of metallic iron nodules (NRI).

The refractory material lining the interior of the furnace may be, for example, refractory board, refractory brick, ceramic brick, or a castable refractory material. More than one refractory material may be used in different locations as desired. For example, a combination of refractory board and refractory brick may be selected to provide additional thermal protection for any underlying substructure. The hearth 42 may include a supporting substructure that moves the refractory material (e.g., a refractory lined hearth) forming hearth 42 through the furnace. The supporting substructure may be formed from one or more different materials, such as, for example, stainless steel, carbon steel, or other metals, alloys, or combinations thereof that have suitable high temperature characteristics for furnace operation.

The hearth furnace 34 may be divided into at least a conversion zone 13 capable of providing a reducing atmosphere for reducible material, and a fusion zone 14 capable of providing an atmosphere to at least partially form metallic iron material. A drying/preheating zone 12 may be provided adjacent the furnace housing capable of providing a drying/preheating atmosphere for the reducible material. Additionally, a cooling zone 15 capable of providing a cooling atmosphere for reduced material containing metallic iron material may be provided in or adjacent the furnace housing immediately following the fusion zone 14. As noted, the cooling zone may be in the furnace housing 11, but as shown in FIG. 1, the cooling zone may be provided outside the furnace housing since the furnace housing is not necessary to its operation. Also as noted, the drying/heating zone may be provided inside or outside the furnace housing in desired embodiments.

In any case, the conversion zone 13 is positioned between the drying/preheating zone 12 and the fusion zone 14 and is the zone in which volatiles from the reducible material, including carbonaceous material, are fluidized, as well as the zone in which at least the initial reduction of metallic iron material occurs. The entry end of the hearth furnace 34, at the drying/preheating zone 12, may be at least partially closed by a restricting baffle 19 that may inhibit fluid flow between the outside ambient atmosphere and the atmosphere of the drying/preheating zone 12, yet provide clearance so as not to inhibit the movement of reducible material into the furnace housing 11. The baffle 19 may be made of suitable refractory material such as silicon carbide or a metal material if the temperatures are sufficiently low. The atmosphere in the hearth furnace 34 is typically maintained at a positive pressure compared to the ambient atmosphere to further inhibit fluid flow from the ambient atmosphere to the hearth furnace. The method of producing metallic iron nodules may include reducing the reducible material in the hearth furnace 34 to metallic iron nodules substantially free of air ingress from the surrounding environment.

The hearth 42 provided within the furnace housing 11 may comprise a series of movable hearth cars 21 that are positioned contiguously end to end as they move through the furnace housing 11. Hearth cars 21 may be movable on wheels 22 that engage rails 23. The upper portion of the hearth cars 21 are lined with a refractory material suitable to withstand the temperatures for reduction of the iron oxide bearing material into metallic iron nodules as explained herein. The hearth cars are positioned contiguously end to end to form hearth 42 and move through the furnace housing 11, so that the lower portions of the hearth cars are not damaged by the heat generated in the furnace as reduction of the iron oxide-bearing material into metallic iron proceeds. Alternatively, the hearth 42 may be a movable belt or other suitable conveyance medium provided with refractory material for the temperatures of the furnace atmospheres.

The hearth furnace may be linear as generally illustrated in FIG. 1. In this connection, the building in which the furnace is housed, or other considerations, may require that certain parts of the furnace be arcuate or at angles, to accommodate these needs. For these purposes, the hearth furnace is classified as linear if a part of its length, usually the conversion zone 13 and/or fusion zone 14, is substantially linear in the direction of travel of the hearth 42. Alternatively, the hearth furnace may be rotary, in which case the hearth cars are pie-shaped or in the form of replaceable sections of a contiguous annular hearth rotatably supported in the furnace housing.

The zones of the furnace 34 are generally characterized by the temperature reached in each zone and the processing of reducible material in each zone. In the drying/preheating zone, moisture is driven off from the reducible material and the reducible material is heated to a temperature short of substantial fluidization of volatiles in and associated with the reducible material positioned on the hearth cars 21. The design is to reach in the drying/preheating atmosphere a temperature in the reducible material as high as reasonable for removing moisture and heating of the reducible material, but below the temperature of substantial fluidization of the volatiles in the carbonaceous material in and associated with the reducible material. This temperature is generally in the range of about 200-400° F. (about 95-200° C.), and is selected usually depending in part on the particular composition of the reducible material and the particular composition of the carbonaceous material. One or more preheating burners 20 may be provided in the drying/preheating zone, for example, in the side walls of the furnace housing 11. The preheating burners 20 may be oxy-fuel burners or air/natural gas fired burners as desired, depending on the desired disposition of the stack gas from the drying/preheating zone and further processing of that that stack gas.

The conversion zone 13 is characterized by heating the reducible material to drive off remaining moisture and most of the remaining volatiles in the reducible material, and at least partially reduce the reducible material. The heating in the conversion zone 13 may initiate the reduction reaction in forming the reducible material into metallic iron nodules and slag. The conversion zone 13 is generally characterized by heating the reducible material to about 1800 to 2350° F. (about 980° C. to about 1290° C.), or higher, depending on the particular composition and form of reducible material of the particular embodiment.

The fusion zone 14 involves further heating the reducible material, now absent most volatile materials, to reduce and melt the iron bearing material, to form metallic iron nodules and slag. The fusion zone generally involves heating the reducible material to about 2400 to 2650° F. (about 1310-1450° C.), or higher, so that metallic iron nodules (NRI) are formed with a low percentage of iron oxide in the metallic iron. If the method is carried out efficiently, there will also be a low percentage of iron oxide in the slag, since the method is designed to reduce very high percentage of the iron oxide in the reducible material to metallic iron nodules.

Figure 2:
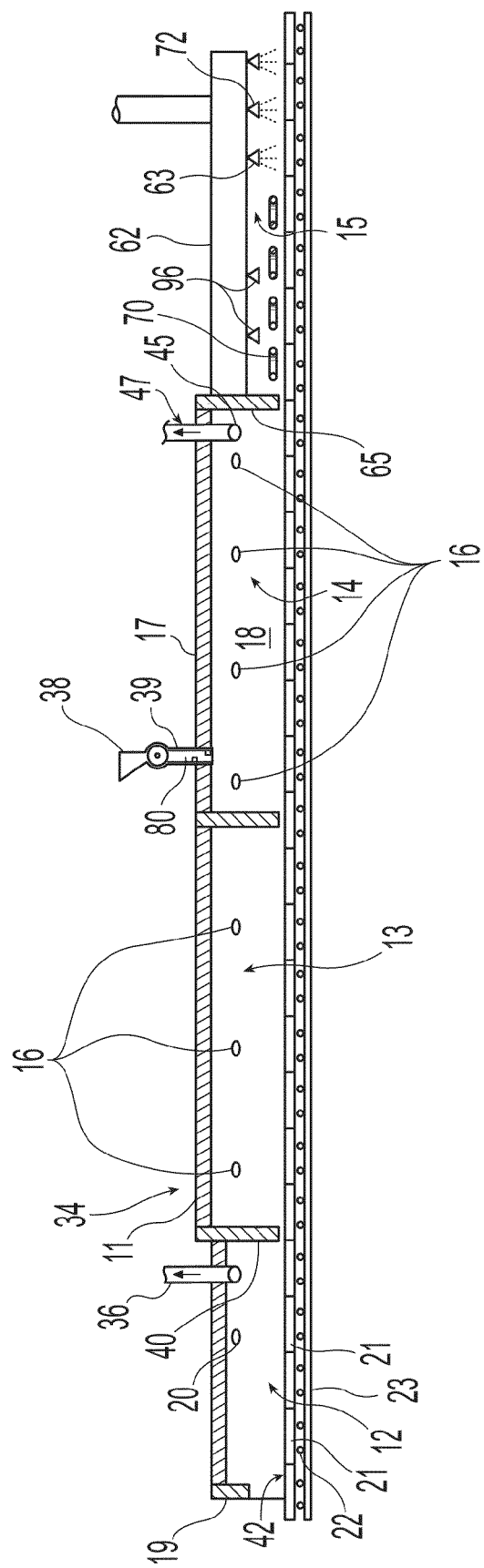
FIG. 2 is a cross sectional diagrammatical view showing a hearth furnace for producing metallic iron material and a method for producing same, illustrating an alternative embodiment of the hearth furnace shown in FIG. 1.

Oxy-fuel burners 16 may be provided in the side wall 18 of the furnace housing 11 such as shown in FIGS. 1 and 2 for heating the reducible material in the conversion zone 13 and fusion zone 14. Alternatively or in addition, the oxy-fuel burners may be positioned in the roof 17 of the furnace housing 11. The oxy-fuel burners 16 are positioned to provide for efficient combustion of the fluidized volatile materials in the conversion zone and to efficiently reduce the reducible material to metallic iron nodules (NRI) in the fusion zone 14.

The oxy-fuel burners 16 should be positioned to provide for efficient heat transfer and efficient reduction of the iron oxide in the reducible material with the least energy consumption. The oxy-fuel burners 16 may be positioned on about 10 foot centers (about 3 m), staggered along opposite side walls 18, about a foot down from the roof 17 of the furnace housing 11. Alternatively, or in addition, the oxy-fuel burners may be positioned opposite each other in the side walls 18 and/or in the roof 17 of the furnace housing 11.

Alternatively, the heating may be carried out in any suitable manner at any suitable temperature. It will be understood that the heating is generally carried out in such a manner as to cause fusion or melting of the metallic iron produced by the process in the fusion zone. For example, the heating may be carried out in an atmosphere using a linear or rotary furnace wherein the conversion zone comprises more than one zone. In the experimental data presented in TABLES 1, 2, and 3 described below, the linear hearth furnace included a first heating zone, or zone I, wherein the temperature of the reducible material is raised and some reduction of the reducible material occurs, and a second heating zone, or zone II, where further reduction occurs but where the temperature does not exceed the melting point of iron. The fusion zone, or zone III in TABLES 1, 2, and 3, immediately follows the conversion zone and includes temperatures where fusion of the reducible material of the heated reducible material may occur. Alternatively, the fusion zone 14 may comprise more than one zone. It will be understood however that the heating may occur in any suitable heating atmosphere at any suitable temperature. In the above example, the first heating zone may have a temperature of up to about 2200° F. (about 1200° C.), the second heating zone may have a temperature up to about 2400° F. (about 1315° C.), and the fusion zone may have a temperature up to about 2650° F. (about 1450° C.).

A first baffle 40 may be provided between the drying/preheating zone 12 and the conversion zone 13. The first baffle 40 is capable of inhibiting direct fluid communication between the atmosphere of the conversion zone 13 and the atmosphere of the drying/preheating zone 12. The first baffle 40 may be made of a suitable refractory material, such as silicon carbide, and may extend downwardly to within a few inches of the reducible material on the hearth 42. The design is to provide for efficient inhibiting of the direct fluids communication between the conversion zone 13 and the drying/preheating zone 12 in the furnace 34, without interfering with movement of reducible material on hearth 42 through furnace housing 11.

Figure 4:
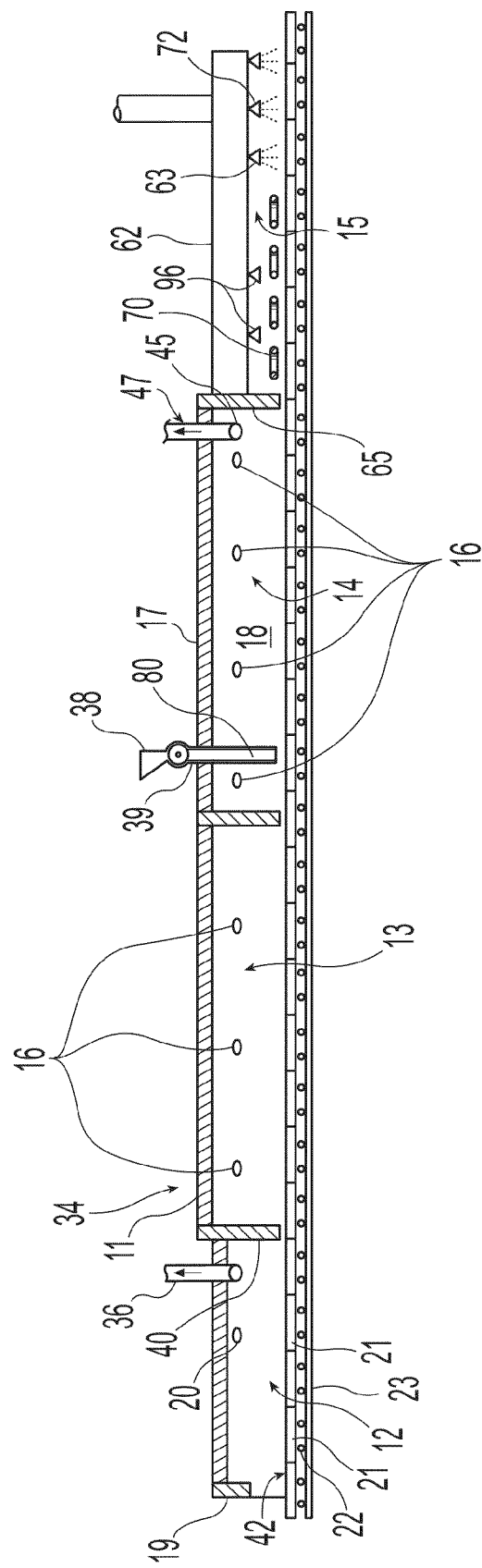
FIG. 4 is a cross sectional diagrammatical view showing a hearth furnace for producing metallic iron material and a method for producing same, illustrating an alternative embodiment of the hearth furnace shown in FIG. 3
Figure 5:
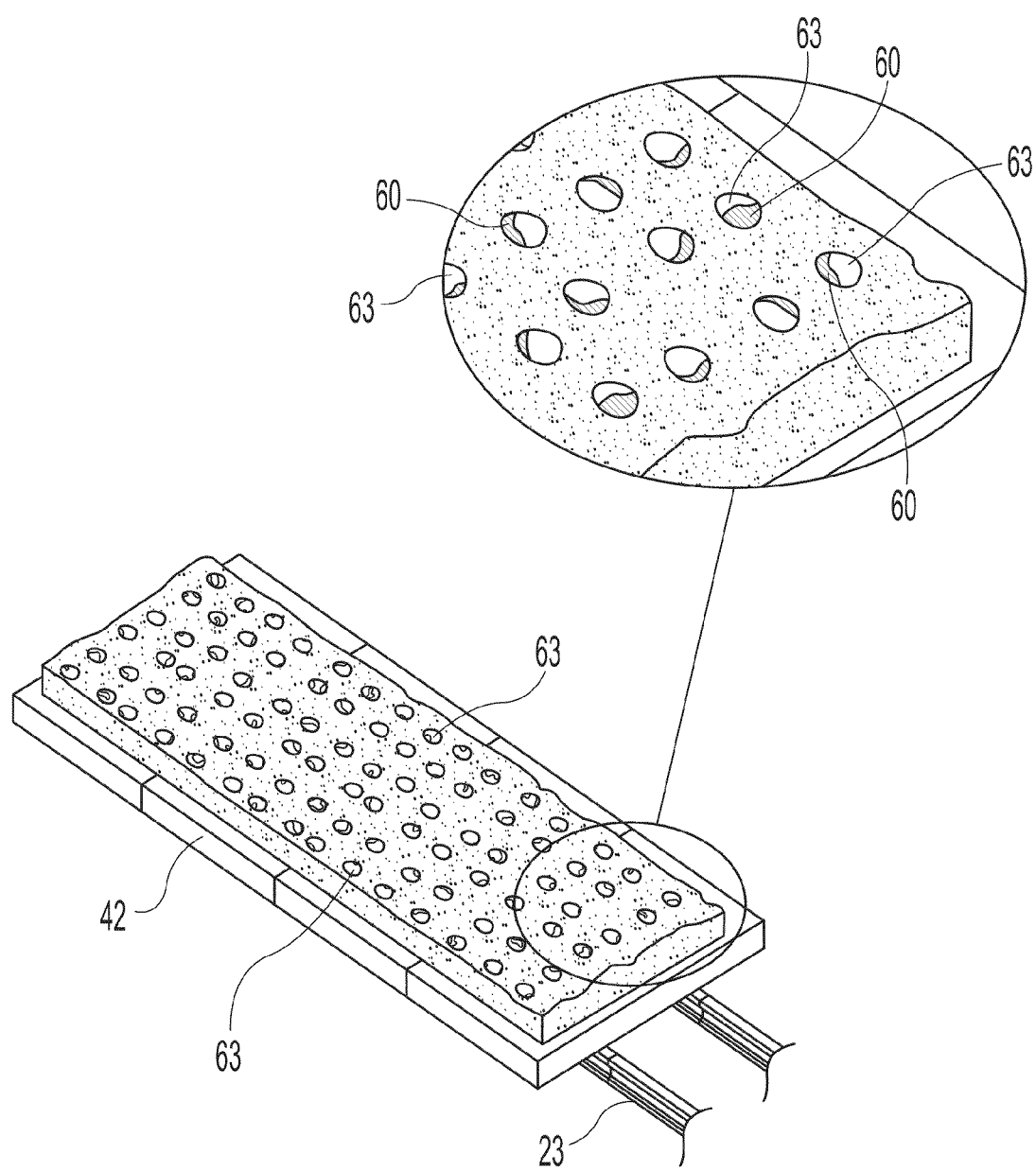
FIG. 5 is a generally top view showing metallic iron nodules above a hearth.

Optionally, a second baffle 50, such as shown in FIGS. 2 and 4, may be provided either between the conversion zone 13 and the fusion zone 14 or part way into the fusion zone 14. The second baffle 50 is capable of inhibiting direct fluid communication between the atmosphere of the fusion zone 14 and the atmosphere of the conversion zone 13 where desired. The second baffle 50 may be a refractory material, such as silicon carbide, and extend to within a few inches of the heated reducible material positioned on the hearth 42 as it moves through the furnace housing 11, to effectively inhibit the direct fluid communication across the second baffle 50.

The cooling zone 15 provides cooling to reduce the temperature of the metallic iron material (NRI) from its formation temperature in the conversion zone 13 and fusion zone 14 to a temperature at which the metallic iron material can be reasonably handled and further processed. This temperature after cooling is generally below 800° F. (about 425° C.) and may be below about 500° F. (about 260° C.) or below. The cooling can be achieved by injection of nitrogen or carbon dioxide through nozzles 96 in the roofs and/or side walls of the furnace housing 11 or external the furnace housing 11. As to the latter, water spray 72 may be used external the furnace housing 11 for the cooling in the cooling zone 15, if desired and provision made for water handling within the system. Alternatively or additionally, a system of coolant tubes 70 may be positioned over the moving hearth 42 as shown in FIG. 1. A vent hood 62 may be positioned above the moving hearth 42 to remove evaporated water and other fluidized materials that come off of the hearth during the spray cooling.

The cooling zone 15 is optionally in the furnace housing 11. However, it is more desirable in certain embodiments to perform the cooling of the metallic iron material outside the furnace housing 11, such as shown in FIGS. 1 through 4, to reduce furnace costs, provide for more efficient cooling, and maintenance and handling considerations.

The exit end of the hearth furnace 34, at the cooling zone 15, may be at least partially closed by a restricting baffle 65 that inhibits fluid flow between the atmosphere of the fusion zone 14 and the atmosphere of the cooling zone 15, yet provides clearance so as not to inhibit the movement of the heated reducible material out the furnace housing 11. The baffle 65 may be made of a suitable refractory material, such as silicon carbide, and may extend to within a few inches of the heated reducible material positioned on the hearth 42 as the heated reducible material moves through the furnace housing 11.

An exhaust gas system may include an exhaust stack 47 having an inlet 45 provided in the conversion zone 13 and/or fusion zone 14. FIGS. 1 through 4 show the exhaust stack 47, for example, in the fusion zone. Alternatively, the exhaust stack 47 may be positioned in or adjacent the conversion zone 13 to enable combustion of volatile matter fluidized in the conversion zone prior to exiting the furnace. The exhaust gas system may have a variable flue damper, not shown. An in-line damper or pressure control may be provided to control the flue gas stream and improve zone pressure control. The exhaust gas system may include a thermal oxidizer to process the flue gas. Optionally, the flue gas may be directed to a heat recovery system or other downstream processing. The drying/preheating zone may include a drying zone exhaust stack 36 provided to remove moisture and other fluids from the drying/preheating zone 12. The drying zone exhaust stack 36 may direct the flow from the drying/preheating atmosphere to combine with the stack gas through exhaust stack 47 into the exhaust gas system. Alternately, the flow from the drying/preheating zone 12 may be directed to a scrubber, baghouse filter, or other exhaust processing separate from the exhaust gas system.

Figure 6:
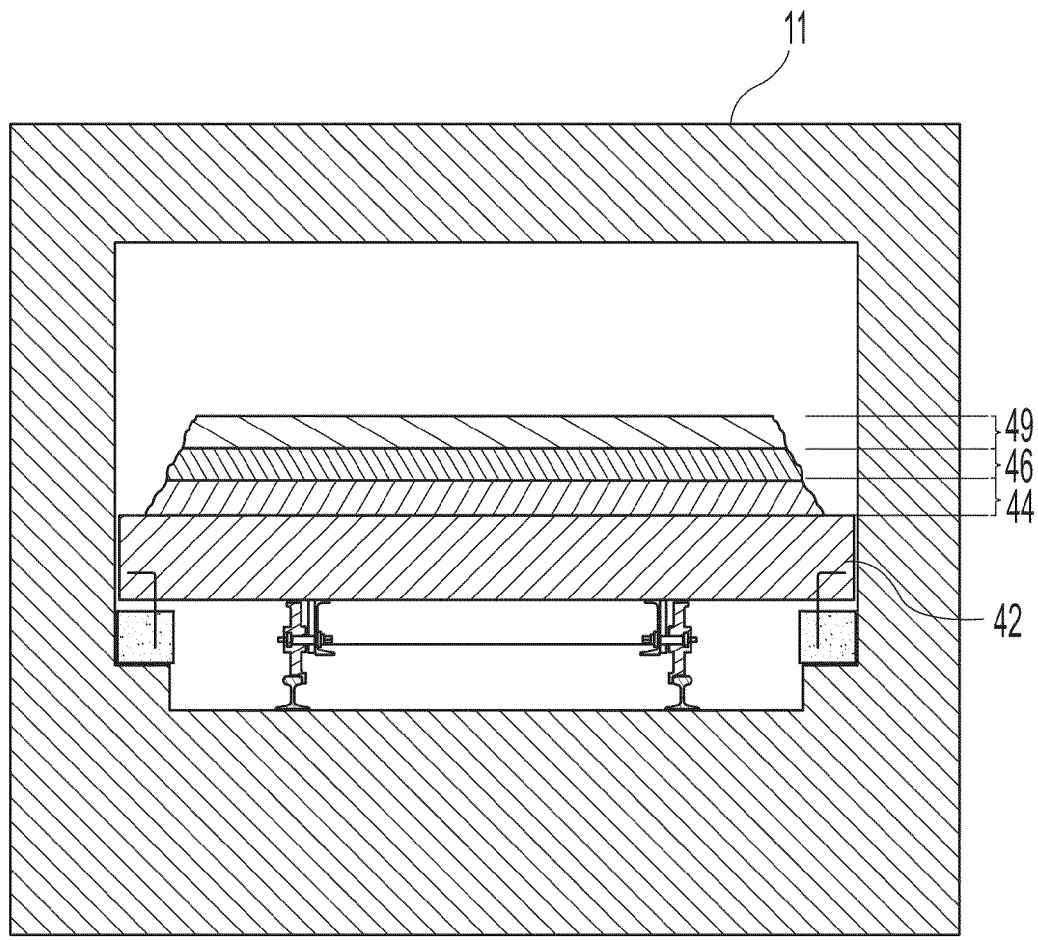
FIG. 6 is a generalized cross-sectional view showing a hearth and the layers thereon.

With reference to FIG. 6, the preparation of the reducible material of iron bearing material and carbonaceous material for processing by the hearth furnace is illustrated. A hearth material layer 44 is provided on hearth 42 that includes at least one carbonaceous material. The carbonaceous material may be any carbon-containing material suitable for use as a reductant with the iron-bearing material. The hearth material layer 44 includes coke, char, or other carbonaceous material, or mixtures thereof. For example, anthracite coal, bituminous coal, sub-bituminous coal, coke, coke breeze or char materials may be used for the hearth layer 44. We have found that certain bituminous and sub-bituminous (e.g. Jim Walter and Powder River Basin) coals may be used in mixtures with anthracite coal, coke, coke breeze, graphite, or char materials.

The hearth material layer 44 may comprise a mixture of finely divided coal and a material selected from the group of coke, char, and other carbonaceous material found to be beneficial to increase the efficiency of iron reduction. The coal particles may be a mixture of different coals such as noncoking coal, or non-caking coal, sub-bituminous coal, or lignite. The hearth material layer 44 may, for example, include Powder River Basin ("PRB") coal and/or char. Additionally, although up to one hundred percent coal is contemplated for use as a hearth material layer, in some embodiments the finely divided coal may comprise up to twenty-five percent (25%) and mixed with coke, char, anthracite coal, or other low-volatile carbonaceous material, or mixtures thereof. In other embodiments, up to fifty percent (50%) of the hearth material layer may comprise coal, or up to seventy-five percent (75%) of the hearth material layer may comprise coal, with the remaining portion coke, char, other low-volatile carbonaceous material, or mixtures thereof. The balance will usually be determined by the amount of volatiles desired in the reduction process and the furnace.

The hearth material layer 44 may comprise two or more layers of carbonaceous materials as desired. The hearth material layer 44 may include a first layer of undevolutized coal and a second layer of coke or char above the first layer of coal. For example, the hearth material layer 44 may include a first layer of sub-bituminous coal such as PRB coal, and a second layer of char material over the coal layer. The char material may be devolatilized carbonaceous material removed from the hearth at the exit end of the furnace and recycled in the hearth material layer 44 (with or without ash from NRI reduction). The layer of char or coke over the layer of devolatilized coal slows and extends the fluidization of volatiles from the coal as the hearth cars 21 move through the conversion zone 13 to later stages in the reduction reaction.

The hearth material layer 44 is of a thickness sufficient to prevent slag from penetrating the hearth material layer 44 and contacting refractory material of hearth 42. For example, the carbonaceous material may be ground or pulverized to an extent such that it is fine enough to prevent the slag from such penetration, but typically not so fine as to create excess ash. As recognized by one skilled in the art, contact of slag with the hearth 42 during the metallic iron nodule process may produce undesirable damage to the refractory material of hearth 42. A suitable particle size for the carbonaceous material of the hearth layer is less than 4 mesh and desirably between 4 and 100 mesh, with a reasonable hearth layer thickness of about ½ inch or more, is effective protection for the hearth 42 from penetration of the slag and metallic iron during processing. Carbonaceous material less than 100 mesh may be avoided because generally high in ash and resulting in entrained dust that is difficult to handle in commercial operations. The mesh size of the discrete particles is measured by Tyler Mesh Size for the measurements given herein.

The reducible material 46 is positioned over the hearth cars 21 above at least a portion of the hearth material layer, typically prior to entering the furnace. The reducible material 46 is generally in the form of a mixture of finely divided iron ore or other reducible iron oxide bearing material, and a reducing carbonaceous material, such as coke, char, anthracite coal or non-caking bituminous and sub-bituminous coal.

The method of producing metallic iron nodules may include providing the layer of reducible material 46 on the underlying hearth material layer 44 as further shown in FIG. 6. The layer of reducible material includes at least a reducible iron-bearing material and reducing material for the production of iron metal nodules and slag. As used herein, iron-bearing material includes any material capable of being formed into metallic iron nodules and slag by the described metallic iron nodule process. The iron-bearing material may include iron oxide material, iron ore concentrate, taconite pellets, recyclable iron-bearing material, pellet plant wastes and pellet screened fines. Further, such pellet plant wastes and pellet screened fines may include a substantial quantity of hematite. In addition, such iron-bearing material may include magnetite concentrates, oxidized iron ores, steel plant wastes (e.g., blast furnace dust, basic oxygen furnace (BOF) dust and mill scale), red mud from bauxite processing, titanium-bearing iron sands and ilmenites, manganiferous iron ores, alumina plant wastes, or nickel-bearing oxidic iron ores. Also, less expensive iron ores high in silica may be used. Other reducible iron bearing materials may also be used for making the reducible material for producing metallic iron nodules used in the processes described herein to produce metallic iron nodules. For example, nickel-bearing laterites and garnierite ores for ferronickel nodules, or titanium bearing iron oxides such as ilmenite that can be made into metallic titanium iron nodules (while producing a titania rich slag).

The iron-bearing material may include recycled micro metallic iron nodules formed in the process of producing metallic iron nodules. Micro metallic iron nodules (called micro-nodules or micro-nuggets) include small particles of agglomerated iron having a size between about 20 mesh and about 3 mesh. Metallic iron nodules less than 20 mesh can also be used depending on the availability of separation and handling systems to recycle micro nodules.

In one alternative, the reducible material may contain mill scale containing more than 55% by weight FeO and FeO equivalent, such as disclosed in U.S. Provisional Patent Application 61/146,455 filed Jan. 22, 2009, incorporated herein by reference.

The iron-bearing material may be finely-ground or otherwise physically reduced in particle size. The particle size of the mill scale or mixture of mill scale and similar metallurgical waste may be at least 80% less than 10 mesh. Alternatively, the iron-bearing metallurgical waste may be of a particle size of at least 80% less than 14 mesh. In one alternative, the iron-bearing material may be ground to less than 65 mesh (i.e., −65 mesh) or less than 100 mesh (i.e., −100 mesh) in size for processing according to the disclosed method of making metallic iron nodules. Larger size particles, however, of iron-bearing material may also be used. For example, pellet screened fines and pellet plant wastes are generally approximately 3 mesh (about 0.25 inches) in average size. Such material may be used directly, or may be reduced in particle size to increase surface contact of carbonaceous reductant with the iron bearing material during processing. A smaller particle size tends to reduce fusion time in the present method.

Various carbonaceous materials may be used in providing the reducible material 46 of reducing material and reducible iron-bearing material. The reducing material may contain at least a material selected from the group consisting of, anthracite coal, coke, char, bituminous coal and sub-bituminous coal (such as Jim Walter coal and Powdered River Basin coal), or combinations thereof. For example, eastern anthracite coal and bituminous non-caking coals may be used as the carbonaceous reductant in at least one embodiment. However, in some geographical regions, such as on the Iron Range in Northern Minnesota, the use of western sub-bituminous non-caking coal offers an attractive alternative, as such coals are more readily accessible with the rail transportation systems already in place, plus they are generally lower in cost and lower in sulfur levels. As such, western sub-bituminous coals may be used in one or more embodiments of the present method as described herein. Alternatively, or in addition, the sub-bituminous coals may be carbonized, such as up to about 1650° F. (about 900° C.), prior to its use. Other coals may be provided, such as low sulfur bituminous coal from Elkhorn seams from eastern Kentucky, as described below. In any case, the carbonaceous material in the reducible material may contain an amount of sulfur in a range from about 0.2% to about 1.5%, and more typically, in the range of 0.5% to 0.8%.

The amount of reducing material in the mixture with iron bearing material to form the reducible material 46 will depend on the stoichiometric quantity necessary for complete metallic reduction of the iron in the reducing reaction in the furnace. Such a quantity may vary depending upon the percentage of iron in the iron-bearing material, the reducing material and the furnace used, as well as the furnace atmosphere in which the reducing reaction takes place. In some embodiments, where the iron bearing material is hematite or magnetite or mixtures thereof, the carbonaceous material in the reducible material may be between 70 and 90% of the stoichiometric amount to complete reduction of the iron in the iron-bearing material. Where the iron bearing material in the reducible material is mill scale or the like with high levels of FeO, the reducible material 46 may include an amount of carbonaceous material that is between 80 and 110% of the stoichiometric amount needed to reduce the iron-bearing material to metallic iron. In other alternative embodiments where mill scale or the like is used for the iron bearing material, the quantity of reducing material necessary to carry out the reduction of the iron-bearing material is between about 85 percent and 105 percent of the stoichiometric quantity of reducing material needed for carrying out the reduction to metallize the iron, and may be between 90 percent and 100 percent.

Additives may optionally be provided to the reducible material 46 separately or in combination for one or more purposes, in addition to the reducing material (e.g., coal or char) and reducible iron-bearing material (e.g., iron oxide material or iron ore). For example, additives may be provided for controlling slag basicity, as binders to provide binder functionality (e.g., lime can act as a weak binder in a micro-agglomerate configuration when wetted), for controlling the slag fusion temperature, to reduce the formation of micro-nodules, and/or for further controlling the content of sulfur in resultant iron nodules formed by the metallic iron nodule process 10. The table of FIG. 7 shows the chemical compositions of various exemplary additives to the reducible material 46. These additives include, for example, chemical compositions such as $Al(OH)_3$, bauxite, bentonite, $Ca(OH)_2$, lime hydrate, limestone, and Portland cement. Other additives may also be used such as $CaF_2$, $Na_2CO_3$, fluorspar, soda ash, aluminum smelter slag, cryolite, and $SiO_2$. Some of the exemplary additives contain trace amounts of Mg, as shown, and in some examples Mg should not be used in quantities that will produce 5% mass or more MgO in the resulting slag.

The reducible material 46 may be formed into compacts either in situ as explained in detail in application Ser. No. 11/296,198, filed Dec. 7, 2005, now U.S. Pat. No. 7,695,544, incorporated by reference, or preformed briquettes, pallets, balls or extrudates (with or without binder) suitable for use in forming metallic iron nodules by the disclosed process. Compacts refer to any compacted reducible material preformed or formed in situ as any desired discrete profile for positioning on the hearth layer. For example, discrete portions, compacts, may also be preformed balls or pallets, or shaped reducible materials such as briquettes or extrudates, which may be preformed using compaction or pressure. It should also be noted that different pressurization during formation of the compacts may result in different processing characteristics as desired for the particular embodiment of the present process.

The present method for producing metallic iron nodules includes delivering a coarse carbonaceous material having particle greater than 6 or 4 mesh, such as between 6 or 4 mesh and ½ inch, over the heated reducible material to assist in fusion and inhibit reoxidation of the reduced material in forming metallic iron nodules. During the formation of the metallic iron nodules in the fusion reduction processes, several chemical reactions may take place. For example, iron oxide may be reduced to iron in the presence of carbon monoxide according to the following reaction:

$$FeO + CO \rightarrow Fe + CO_2 \quad \text{(Reaction 1)}.$$

In another example, desulfurization of the iron may occur in accordance with the following reaction:

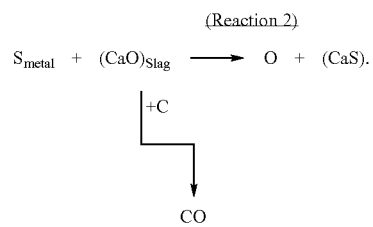

The introduction of the coarse carbonaceous material adjacent to the introduction of the reducible material into the fusion atmosphere and/or in the fusion atmosphere may be beneficial in several ways. The introduction of the coarse carbonaceous material may promote the presence of carbon monoxide in the atmosphere by reacting with $CO_2$ present in the atmosphere. The presence of carbon monoxide drives the Reaction 1 to the direction to provide deoxidation or reduction of the iron. The introduction of the coarse carbonaceous material may help to drive the reaction of Reaction 2 in the direction to desulfurize the metallic iron nodules during formation. It will be understood that these advantages are exemplary only, and other advantages may be achieved.

As shown in FIGS. 1 and 2, the coarse carbonaceous material is introduced to the furnace through shielding entry system 39 adapted to deliver the coarse carbonaceous material into the furnace at the desired location at or near the fusion zone 14. The shielding entry system 39 may be configured as a stepped labyrinth adapted to inhibit emission of infrared radiation from the furnace atmosphere. The shielding entry system 39 may extend to adjacent the roof 17 of the furnace 34 to deliver the coarse carbonaceous material in an upper portion of the furnace to inhibit significant disruption of the flow of furnace atmosphere across the shielding entry system 39. Alternatively, in some embodiments, the coarse carbonaceous material may be guided into the furnace atmosphere with in 6 inches of the reducible material on the hearth as explained in detail below.

The coarse carbonaceous material is introduced from above and over the heated reducible material after reduction of the reducible material has progressed, and optionally before carburization of the reduced material begins, to assist in fusion and inhibit reoxidation of the reduced material during fusion in forming metallic iron nodules. The shielding entry system 39 may comprise feed mechanism 38 assembled with furnace 34 adapted to facilitate distribution of the coarse carbonaceous material over the partially reduced iron bearing material in or near the fusion zone 14. The shielding entry system 39 may also effectively seal the fusion atmosphere from the exterior atmosphere outside the furnace 34. The sealing of the shielding entry system 39, however, may not be a complete seal so as to prevent leakage, but may be less than a perfect seal as appropriate to allow control and support of the atmosphere within the shielding entry system and feed mechanism 38 as desired with some tolerable leakage.

Figure 3:
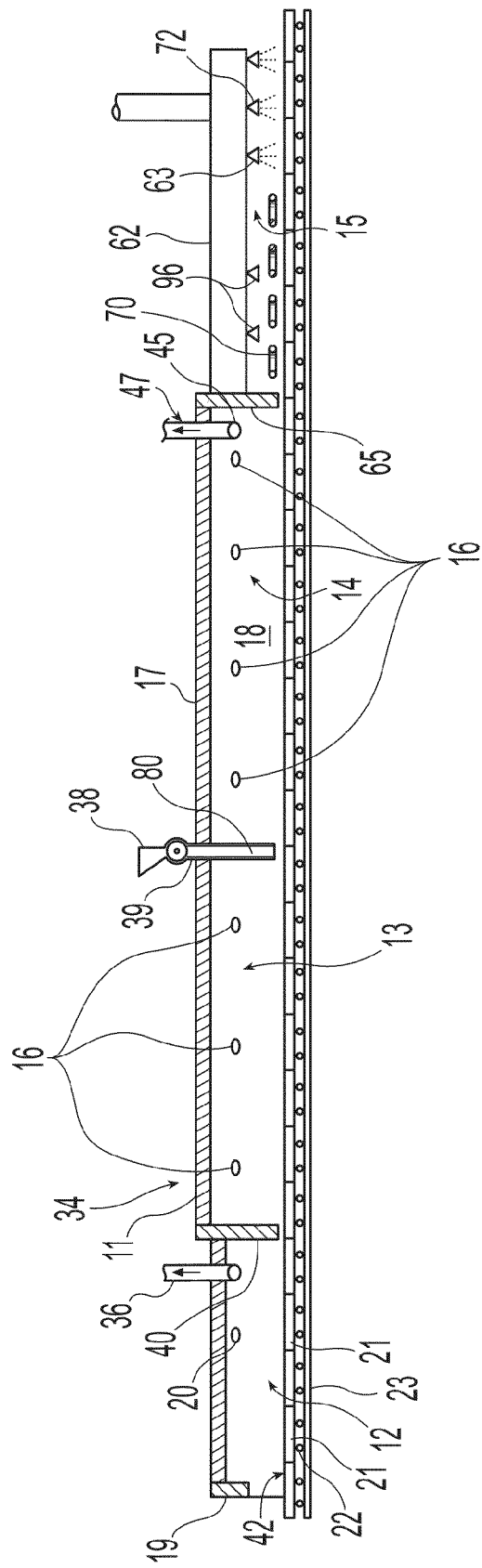
FIG. 3 is a cross sectional diagrammatical view showing an alternative hearth furnace for producing metallic iron material and a method for producing same.
Figure 9:
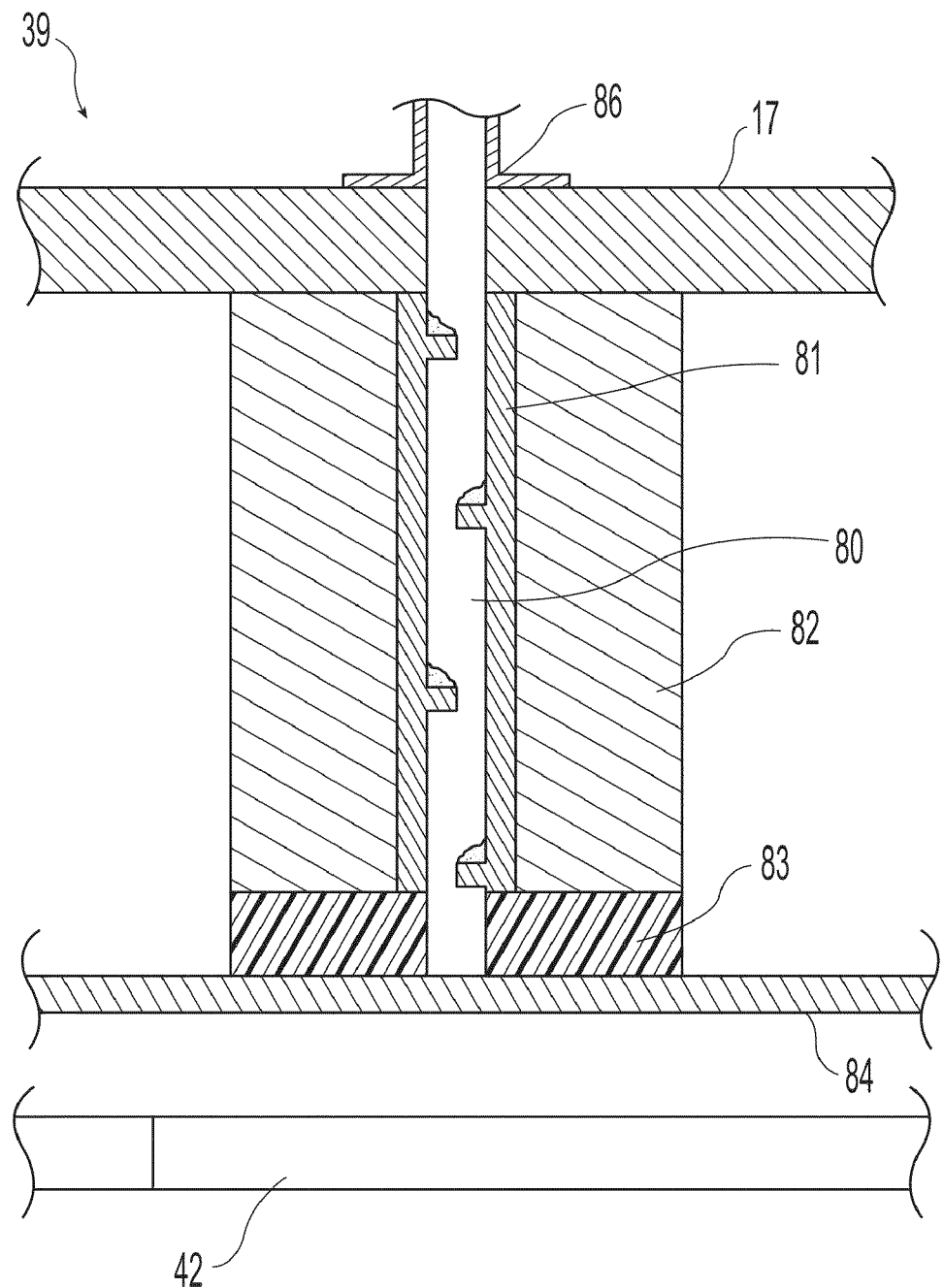
FIG. 9 is a partial cross-section view illustrating an alternative shielding entry system for delivering coarse carbonaceous material for producing metallic iron material.
Figure 10:
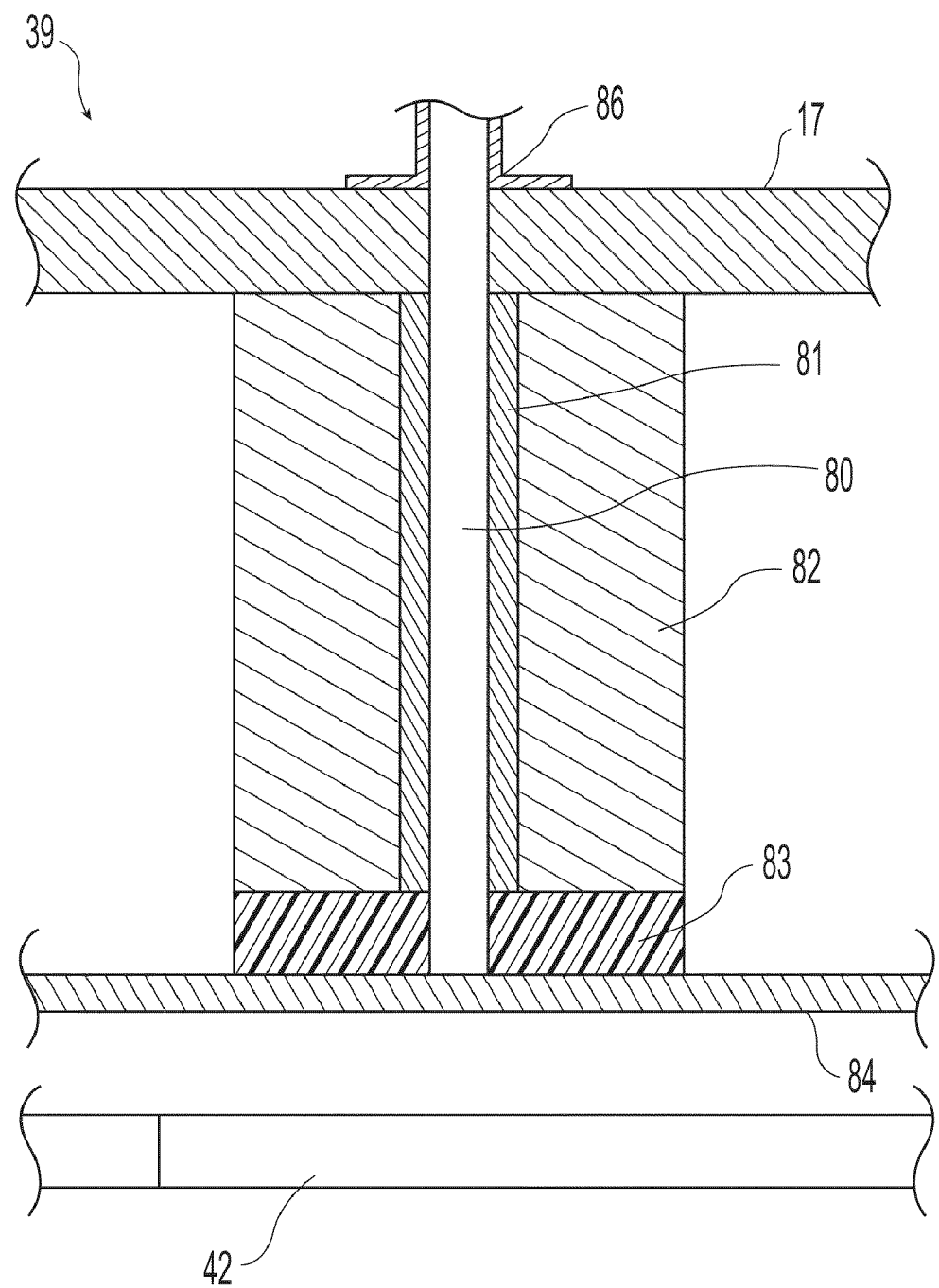
FIG. 10 is a partial cross-section view illustrating another alternative shielding entry system for delivering coarse carbonaceous material for producing metallic iron material.

As shown in FIGS. 3 and 4, the shielding entry system 39 may be supported by support beams 83 positioned transverse to the direction of movement of the hearth that are made of, for example, heat-resistant materials such as silicon carbide. The support beams 83 may be arranged on a shelf 84 positioned above the hearth 42 as desired as shown in FIGS. 9 and 10. This arrangement facilitates the removal and replacement of the shielding entry system 39 for maintenance and repair, when necessary. Alternatively, the shielding entry system 39 may be secured to one or more inner surfaces of the furnace housing 11 by suitable attachment means.

In any event, coarse carbonaceous material 49 may be discharged through shielding entry system 39 onto at least partial reduced reducible material, and likely may provide a layer over at least some of the discrete portions of the reducible material 46. The coarse carbonaceous material of the overlayer has an average particle size greater than an average particle size of the hearth layer and greater that mesh 6 in particle size. In addition or alternatively, the overlayer of coarse carbonaceous material may include discrete particles having a size greater than 4 mesh and in some embodiments, the overlayer of coarse carbonaceous material may have discrete particles with a size between 4 mesh or 6 mesh and about ½ inch (about 12.7 mm). There may be of course some particles in the coarse carbonaceous material less than 4 mesh or 6 mesh in size in commercially made products, but the substantial majority of the discrete particles will be greater than 4 mesh or 6 mesh where a coarse carbonaceous material of particle size greater than 4 mesh or 6 mesh is desired. Finer particles of carbonaceous material that may be present in some commercially available compositions, are tolerated but not desired. The coarse carbonaceous material may be selected from the group consisting of anthracite coal, bituminous coal, sub-bituminous coal such as PRB coal, coke, char, and mixtures of two or more thereof.

The overlayer may include coarse carbonaceous material containing volatiles in desired levels by selection of the coarse carbonaceous material. We have found that fluidization and combustion of volatiles from the carbonaceous material in the overlayer enhances fusion and inhibits reoxidation of the at least partially reduced reducible iron material in the fusion zone 14. The reduced surface area of the coarse material between 4 mesh or 6 mesh and about ½ inch (about 12.7 mm) slows the fluidization and carbonization of volatiles in the coarse carbonaceous material providing a distribution of fluidized volatiles through the fusion zone 14, increasing the $CO:CO_2$ ratio adjacent the at least partially reduced reducible material and providing additional energy from combustion to assist the reaction in the fusion zone.

Figure 11A:
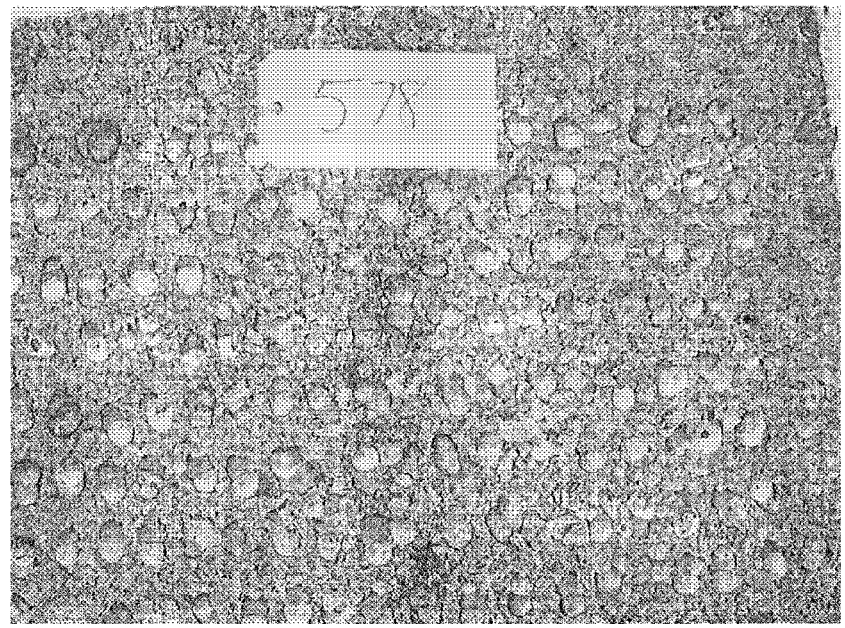
FIGS. 11A and 11B are images showing metallic iron material and slag produced by the present method.
Figure 11B:
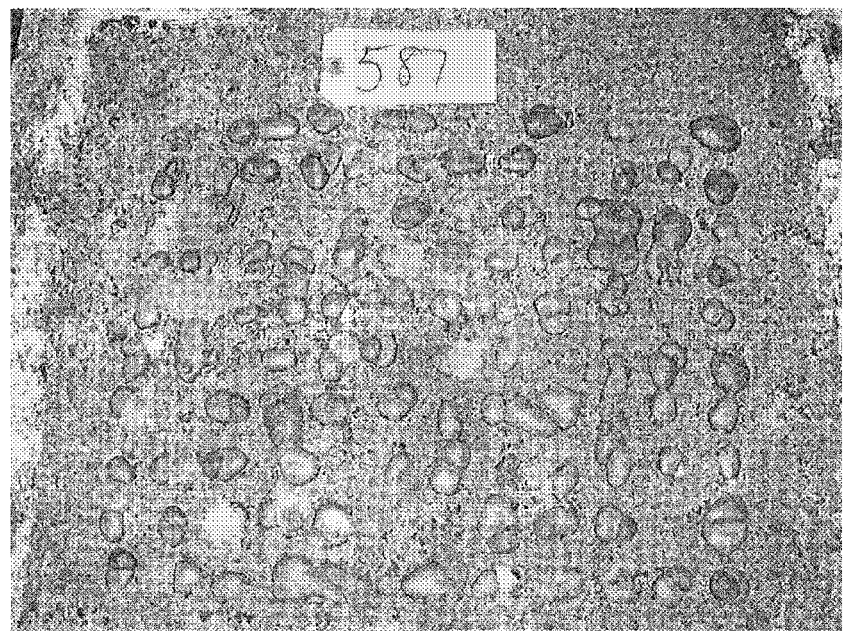

In the present method of making metallic iron nodules, the prepared reducible material 46 is heated in a drying/heating atmosphere to drive off moisture and heat the mixture, and then heated in a reducing atmosphere to drive off remaining moisture, fluidize volatiles in the carbonaceous materials and at least partially reduce the reducible material. Next, the at least partially reduced reducible material is heated in a fusion atmosphere above the melting point of iron to form, one or more metallic iron nodules and slag. As further shown in FIGS. 5 and 11, resultant slag 60 on hearth material layer 44 is shown with the one or more metallic iron nodules 63. That is, slag beads on hearth material layer 44 are separated from the iron nodules 63 or attached thereto. The metallic iron nodules 63 and slag 60 (e.g., attached slag beads) are discharged from hearth 42, and the discharged metallic nodules are then separated from the slag 60.

The carbonaceous material may be introduced from above and onto the reducible material layer within the furnace 34 by delivery through a shielding entry system 39. The amount of carbonaceous material delivered into and through the shielding entry system 39 may be controlled through the action of a feed mechanism 38 which is part of the shielding entry system 39 and attached to a portion of the furnace housing 11. The shielding entry system is adapted to inhibit emission of infrared radiation from the furnace atmosphere and may seal the furnace atmosphere from exterior atmosphere while introducing coarse carbonaceous material greater than 6 mesh into an upper portion of the furnace to be distributed over the at least partially reduced reducible iron bearing material in the furnace 34. The layer of carbonaceous material provides coverage of the reducible material after at least partial reduction of the reducible iron bearing material assists in the fusion reaction by inhibiting reoxidation and decarburization of the partially reduced material.

As shown in FIG. 1, one or more shielding entry systems 39 may be provided within the furnace 34 along the fusion zone 14 to introduce coarse carbonaceous material into the furnace and over the partially reduced material. At least one shielding entry system 39 may be provided in the conversion zone and/or the fusion zone in at least one location such that the temperature of the furnace atmosphere adjacent the at least partially reduced reducible iron bearing material is between 2200 and 2650° F. (about 1200 and 1450° C.). In the alternative shown in FIG. 1, each shielding entry system 39 may be adapted to deliver a portion of the desired amount of coarse carbonaceous material into an upper portion of the furnace where the furnace atmosphere near the at least partially reduced reducible iron bearing material is between about 2200 and 2400° F. (about 1200 and 1315° C.). For example, when about 0.75 lb./ft$^2$ (3.66 kg/m$^2$) of coarse carbonaceous material is desired to be introduced over the reducible material, three shielding entry systems 39 may each be adapted to provide about 0.25 lb./ft$^2$ (1.22 kg/m$^2$) at locations along the furnace 34 near or in the fusion zone 14.

As shown in FIG. 2, in some embodiments the shielding entry system 39 may be located in furnace 34 near or within the fusion zone 14 adjacent the optional second baffle 50. The positioning of the shielding entry system 39 is provided to deliver at least a portion of the desired amount of coarse carbonaceous material into an upper portion of the furnace where the at least partially reduced reducible iron bearing material is between about 2200 and 2400° F. (about 1200 and 1315° C.) on either or both sides of second baffle 50. The positioning of the shielding entry system 39 at this location provides coverage of the carbonaceous material after at least partial reduction of the reducible iron bearing material and adjacent the beginning of fusion assisting in the formation of metallic iron nodules. The introduction of the coarse carbonaceous material at this location provides for fusion of the metallic iron nodules in a shorter time period and substantial inhibiting of reoxidation and decarburization of the reduced material during fusion.

In yet another alternative, as shown in FIG. 3, the shielding entry system 39 is located within furnace 34 instead of the optional second baffle 50. In this alternative, the shielding entry system 39 is provided in a desired location in the conversion zone 13, the fusion zone 14, or between these two zones, where at least partial reduction of the iron bearing material has occurred. The shielding entry system 39 is capable of inhibiting direct fluid communication between the atmospheres of the fusion zone 14 and the conversion zone 13. The shielding entry system 39 may extend to within about six inches or within about 3 inches of the heated reducible material positioned on the hearth 42 as it moves through the furnace housing 11, to effectively inhibit the direct flow of furnace atmospheres between opposite sides of the shielding entry system 39. With this distance of separation, within about six inches or within about 3 inches of the reducible material, the velocity of the flow of furnace atmosphere within the furnace 34 may have a negligible effect on the delivery of the coarse carbonaceous material through the shielding entry system 39 onto the heated reducible material. As shown in FIG. 4, the shielding entry system 39 may be used with the optional baffle 50.

In any case, the coarse carbonaceous material overlayer may be introduced at a temperature up to about 2650° F. (about 1450° C.), and may be between about 2200 and 2650° F. (about 1200 and 1450° C.) to avoid consumption of the coarse carbonaceous material in the drying/preheating and conversion zones 12, 13. It will be understood that the particular introduction temperature may vary depending on the specific furnace, specific processing conditions and specific reducible materials used. In some examples, the coarse carbonaceous material is introduced into the furnace atmosphere at a temperature before carburization of the reduced material begins. For example, the coarse carbonaceous is introduced to form the overlayer into the furnace 34 in fusion zone 14 prior to the temperature at which substantial fusion begins.

The shielding entry system 39 may be positioned substantially vertically within the furnace 34 for delivery of a substantially even distribution of coarse carbonaceous material across the width of the heated reducible material. A substantially even distribution of coarse carbonaceous material may be spread across the width of the heated reducible material is a layer over the heated reducible material having a thickness variation of less than about ½ inch.

Alternatively, the shielding entry system 39 may be positioned in a slanted configuration for delivery of the coarse carbonaceous overlayer onto the partially reduced iron bearing material in the direction of flow of gas atmosphere in the furnace 34. It is also contemplated that the shielding entry system 39 is positioned in a slanted configuration for delivery of the coarse carbonaceous material onto the partially reduced iron bearing material in a direction of movement of the hearth through the furnace, which may or may not be in the direction of flow of the gas atmosphere in the furnace 34.

Figure 8A:
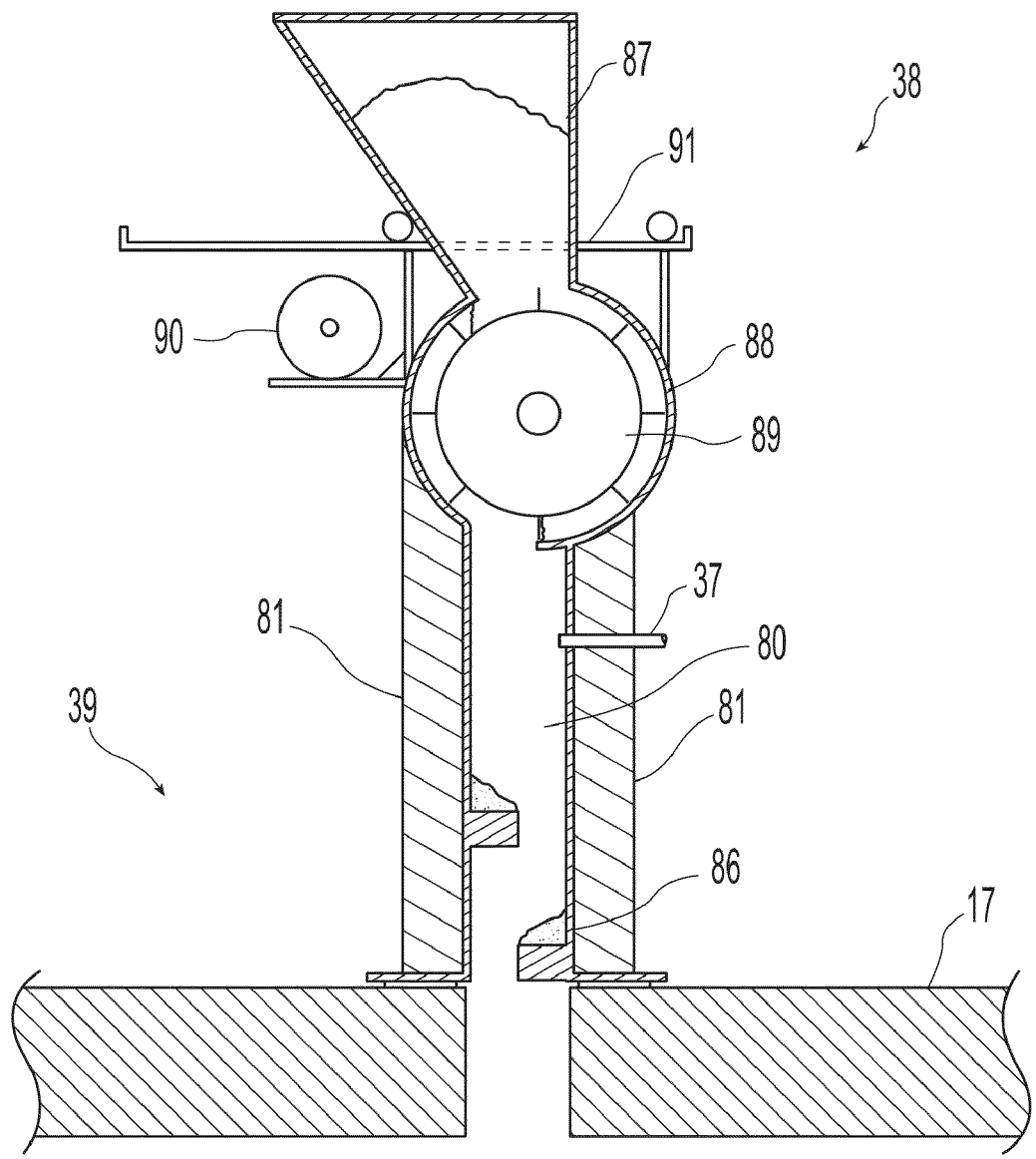
FIG. 8 is a partial generalized cross-sectional view showing a device for feeding coarse carbonaceous material to the shielding entry system for producing metallic iron material.
Figure 8B:
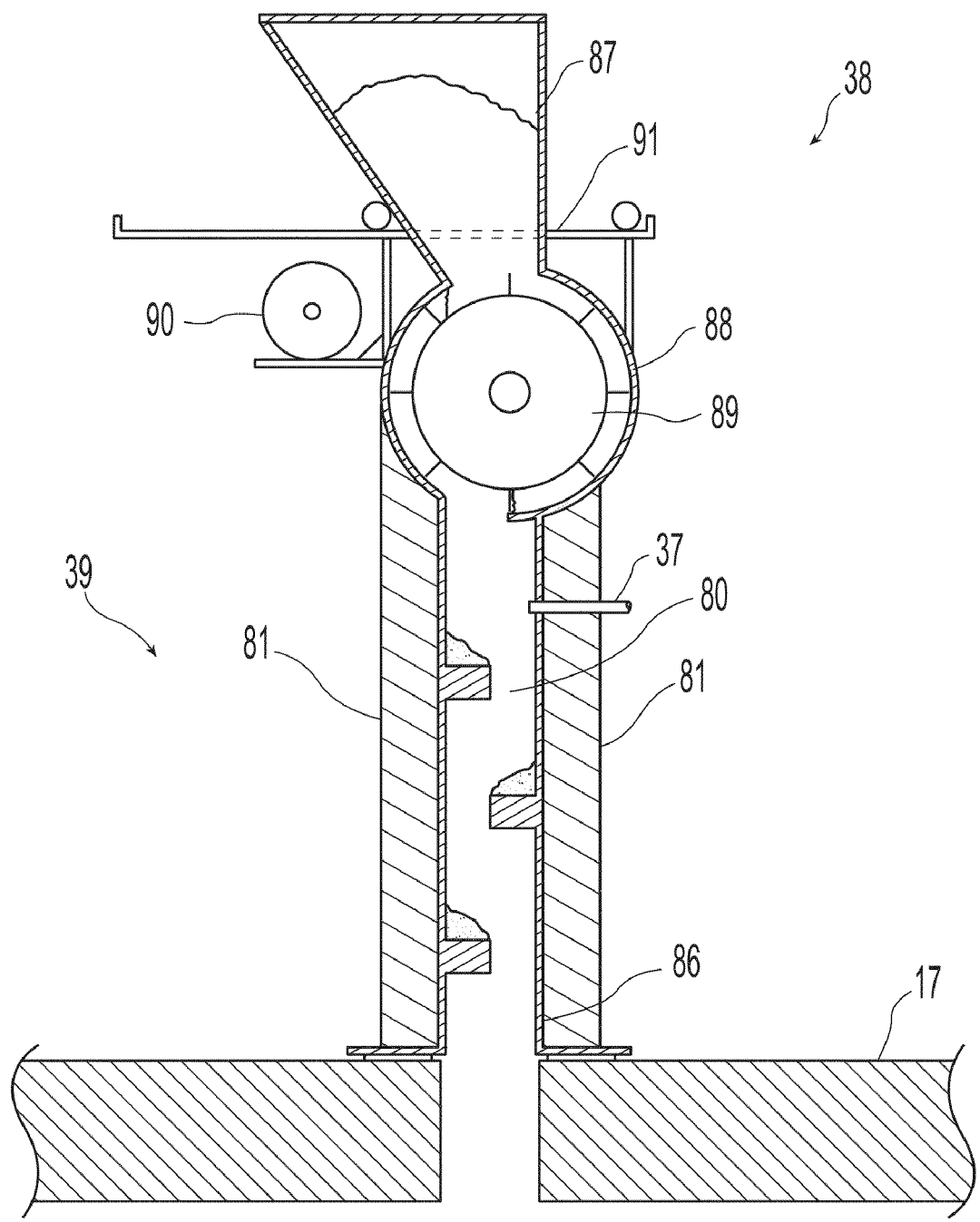

In any case, as shown in FIG. 8 the shielding entry system may be configured to inhibit infrared radiation emission from the furnace atmosphere. This configuration can be provided by a stepped offset in the refractories in the furnace roof or immediate above the furnace roof as shown in FIG. 8 such that the offset refractories stop direct infrared radiation from the furnace atmosphere. The shielding entry system 39 may include a guide 80 to deliver the coarse carbonaceous material from the feed mechanism 38 into the upper portion of the furnace and fall onto the partially reduced iron bearing material, or may be a guide 80 to deliver the coarse carbonaceous material from the feed mechanism 38 to close to the partially reduced iron bearing material. As used herein, the term guide describes a device to direct the delivery or introduction of the coarse carbonaceous material greater than 6 mesh over the partially reduced iron bearing material to form the overlayer. The guide 80 may have a width of less than or equal to about two inches wide in the direction of movement of the heated reducible material through the furnace 34.

Alternatively, the guide 80 may have a width of less than or equal to about six inches wide in the direction of movement of the heated reducible material through the furnace 34. In embodiments where the guide 80 is employed at the elevated temperatures within the fusion zone 14 of the furnace 34, an insulating material 81, for example fiber board insulation, may be used to cover and insulate the guide 80. For further protection from the furnace temperatures that exist in the fusion zone 14 of furnace 34, another layer of insulating material 82, for example fiber block insulation, may be used to cover and protect insulating material 81 which covers and insulates the guide 80. The arrangement of insulating materials 81 and 82 reduces the exposure of the guide 80 to the elevated temperatures within the furnace. Cooling panels may be optionally provided adjacent the guide 80 for cooling the supply channel to a desired temperature.

In any case, the guide 80 of the shielding entry system 39 may be configured adapted to inhibit emission of infrared radiation from the furnace atmosphere through the shielding entry system. As shown in FIGS. 8 and 9, the stepped labyrinth may be in the form of a pellet ladder. The stepped labyrinth includes offset, alternating protrusions that extend from the inner surfaces of the guide 80. In this embodiment, the stepped labyrinth provides a step-wise, controlled delivery of the coarse carbonaceous material onto the partially reduced iron bearing material to form a substantially uniform overlayer.

To further explain the shielding entry system, the feed mechanism 38 may deliver the coarse carbonaceous material as schematically shown in FIG. 8. The feed mechanism 38 may be configured to allow the carbonaceous material to fall by gravity through the guide onto the at least partially reduced reducible iron bearing material. The shielding entry system 39 of FIGS. 3 and 4 may be positioned to distribute the coarse carbonaceous material over the partially reduced reducible iron bearing material in a more even distribution of the coarse overlayer. When delivering coarse carbonaceous material to the upper portion of the furnace as in FIGS. 1 and 2, the overlayer may be less even distribution because of the free fall of the coarse carbonaceous material from the upper portion of the furnace to the partial reduced reducible iron bearing material, with coarse carbonaceous material partially consumed by combustion in the process. In any case, the shielding entry system 39 delivering coarse carbonaceous material over the partially reduced iron can provide fluidized volatiles to the fusion zone 14 to combust and enhance fusion and slag separation in forming NRI.

The feed mechanism 38 may include feed hopper 87 to regulate feed of the coarse carbonaceous material through a star feeder comprising a containment shell 88 and a roll feeder 89 with vanes driven by a drive motor 90. In action, the drive motor 90 actuates roll feeder 89 such that the vanes meter an amount of coarse carbonaceous material supplied from the feed hopper 87 through containment shell 88. When the coarse carbonaceous material has reached an aperture near the bottom of the containment shell 88, the coarse carbonaceous material falls into the upper portion of the furnace housing or into and through guide 80 of shielding entry system 39 onto the partially reduced reducible iron bearing material. Alternatively, a sealed vibratory feeder or other feeder may be provided as desired.

The feed mechanism 38 may be positioned by a support based frame 86 that is secured to a portion of the furnace housing 11. The support based frame is position on furnace housing 11 and may assist shielding entry system 39 in sealing the fusion atmosphere of furnace 34 from the exterior atmosphere. The feed hopper 87 may be stabilized by a support frame 91 adapted for the hopper as desired.

The coarse carbonaceous material supplied to the feed hopper 87 of feed mechanism 38 may be mixed with other additives as desired, and then supplied to the shielding entry system 39. The feed hopper may be supplied with a source of nitrogen or other carrier gases to provide a positive pressure to the furnace atmosphere. Additionally, the carrier gas provided to the feed hopper may assist in delivery of the coarse carbonaceous material and may reduce oxidation and consumption of the coarse carbonaceous material before delivery through the shielding entry system 39. Other additives, including antioxidants and anti-caking agents, may also be mixed with the coarse carbonaceous material that is supplied to the feed hopper 87 of feed mechanism 38.

The coarse carbonaceous material may be elutriated or mixed with a carrier gas or mixture of carrier gases prior to being delivered over the partially reduced reducible iron bearing material, thus delivering the elutriated coarse carbonaceous material to form the overlayer. The carrier gas may be directed into the shroud through one or more gas injection lances 37, as shown in FIG. 8. The carrier gas may be selected according to the desired furnace atmosphere adjacent delivery of the coarse carbonaceous layer 49. For example, nitrogen, carbon monoxide, carbon dioxide, recycled furnace gases, and combinations thereof may all be suitable carrier gases. In one alternative, the oxygen in the carrier gas is selected to be less than the stoichiometric amount of oxygen needed for oxidation of the coarse carbonaceous material. The rate that the coarse carbonaceous material and elutriating gas is fed to furnace may be controlled to provide a desired distribution and depth to the layer of coarse carbonaceous material over the partially reduced reducible iron bearing material in the desired furnace atmosphere.

In addition or in the alternative, the coarse carbonaceous material may be introduced into the heating atmosphere using a suitable pipe feeder, lance or duct. For example, the coarse carbonaceous material may be introduced using a lance or other suitable type of duct, where the coarse carbonaceous material may be elutriated. It will be understood that the lances may be roof lances, wall lances, and combinations of roof and wall lances may all be used.

The coarse carbonaceous material may be of any suitable size greater than 6 mesh suitable for delivery through the shielding entry system by elutriation or other means. In some examples, the coarse carbonaceous material has a particle size of above about 4 mesh. The coarse carbonaceous material may have a particle size of between 6 mesh or 4 mesh and ½ inch. It will be understood that various combinations of sizes may be used.

It will be understood that the amount of coarse carbonaceous material selected will vary depending on the various processing conditions. As discussed above, the amount of coarse carbonaceous material is to provide a heating atmosphere that has a high level of carbon monoxide gas to encourage the Reaction 1 and Reaction 2 to proceed to the right. In some examples, the coarse carbonaceous material is introduced as a layer over the partially reduced reducible iron bearing material. The coverage of the layer may be between about 0.25 lb./ft$^2$ (1.22 kg/m$^2$) and about 0.75 lb./ft$^2$ (3.66 kg/m$^2$) over the partially reduced reducible iron bearing material. Alternatively, the layer may be between about 0.25 lb./ft$^2$ (1.22 kg/m$^2$) and about 1.25 lb./ft$^2$ (6.10 kg/m$^2$) over the partially reduced reducible iron bearing material.

TABLE 1

Linear Hearth Furnace Test Run Log, Komarek Briquettes and Coke Cover Layer

| LHF # | Zone I Time (min) | Zone I Temp (F.) | Zone II Time (min) | Zone II Temp (F.) | Zone III Time (min) | Zone III Temp (F.) | FXT Total Time | Burners | Comments |
|---|---|---|---|---|---|---|---|---|---|
| 546 | 8.1 | 1637 | 9.3 | 2277 | 19.7 | 2561 | 37.1 | Air-fuel burner | 100% NRI (Air-Burners) |
| 547 | 8.1 | 1865 | 9.3 | 2259 | 19.7 | 2541 | 37.1 | Oxy-fuel burner | 100% NRI |
| 548 | 8.1 | 1978 | 9.3 | 2330 | 13.8 | 2530 | 31.2 | Oxy-fuel burner | 70% NRI, incomplete slag separation, incomplete fusion |
| 549 | 8.1 | 2002 | 9.3 | 2350 | 15.3 | 2531 | 32.7 | Oxy-fuel burner | 90% NRI, Temp in Zone II too high? Time too long? |
| 550 | 4.5 | 2034 | 5.2 | 2341 | 15.3 | 2533 | 25.0 | Oxy-fuel burner | No NRI |
| 551 | 4.5 | 1836 | 5.2 | 2196 | 15.3 | 2485 | 25.0 | Oxy-fuel burner | No NRI, Slag segregation at base, nearly ready to fuse |
| 552 | 4.5 | 1923 | 5.2 | 2262 | 23.0 | 2562 | 32.7 | Oxy-fuel burner | 100% NRI |
| 553 | 4.5 | ? | 5.2 | 2354 | 17.2 | 2532 | 26.9 | Oxy-fuel burner | 60% NRI |
| 554 | 4.5 | 1341 | 5.2 | 2231 | 17.2 | 2546 | 26.9 | Oxy-fuel burner | High oxygen in Zone I. Only the outer 2 rows made NRI |
| 555 | 4.5 | 1785 | 5.2 | 2282 | 17.2 | 2565 | 26.9 | Oxy-fuel burner | Only outer rows made NRI. Some in center fused over. |
| 556 | 4.5 | 1750 | 5.2 | 2183 | 23.0 | 2561 | 32.7 | Oxy-fuel burner | Most fused, 12 briquettes in center did not fuse |
| 557 | 4.5 | 1931 | 5.2 | 2345 | 23.0 | 2558 | 32.7 | Oxy-fuel burner | 100% NRI |
| 558 | 4.5 | 1813 | 5.2 | 2222 | 17.2 | 2560 | 26.9 | Oxy-fuel burner | Not fused |
| 559 | 4.5 | 2024 | 5.2 | 2345 | 17.2 | 2572 | 26.9 | Oxy-fuel burner | 100% NRI |
| 560 | 4.5 | 2080 | 5.2 | 2356 | 13.8 | 2582 | 23.5 | Oxy-fuel burner | 100% NRI |
| 561 | 4.5 | 1768 | 5.2 | 2291 | 13.8 | 2572 | 23.5 | Oxy-fuel burner | Only outer 2 rows made NRI. "Cold" furnace? |
| 562 | 4.5 | 1856 | 5.2 | 2354 | 13.8 | 2573 | 23.5 | Oxy-fuel burner | Better than 561, still unfused briquettes in center of furnace |
| 563 | 4.5 | 1891 | 5.2 | 2460 | 13.8 | 2579 | 23.5 | Oxy-fuel burner | 97% NRI, still 6 unfused briquettes in center of furnace |
| | | | | | | | | | Inserted horizontal baffle wall in Zone I |
| 564 | 4.5 | 1535 | 9.3 | 2282 | 13.8 | 2555 | 27.6 | Oxy-fuel burner | 100% NRI. Doubled time in Zone II. |
| 565 | 4.5 | 1360 | 5.2 | 2340 | 13.8 | 2583 | 23.5 | Oxy-fuel burner | 75% conversion, high oxygen levels, CO very low |
| 566 | 4.5 | 1587 | 5.2 | 2311 | 13.8 | 2579 | 23.5 | Oxy-fuel burner | No NRI produced, no obvious reason |
| 567 | 4.5 | 1592 | 6.6 | 2305 | 17.2 | 2566 | 28.3 | Oxy-fuel burner | 95% NRI, a few in center did not reduce |
| 568 | 4.5 | 1648 | 7.8 | 2336 | 17.2 | 2577 | 29.5 | Oxy-fuel burner | 100% NRI, extended time in Zone II |
| 569 | 4.5 | 1641 | 7.8 | 2325 | 15.3 | 2576 | 27.6 | Oxy-fuel burner | Center briquettes failed to fuse |
| | | | | | | | | | Removed horizontal baffle wall from Zone I |
| 570 | 4.5 | 1711 | 5.2 | 2314 | 13.8 | 2573 | 23.5 | Oxy-fuel burner | Rpt of 560, 12 briquettes in center did not fuse |
| 571 | 4.5 | 1763 | 5.2 | 2390 | 17.2 | 2582 | 26.9 | Oxy-fuel burner | 100% NRI |
| 572 | 4.5 | 1960 | 5.2 | 2324 | 15.3 | 2576 | 25.0 | Oxy-fuel burner | NRI, two partly fused briquettes |
| 573 | 4.5 | 2085 | 5.2 | 2322 | 13.8 | 2582 | 23.5 | Oxy-fuel burner | 12 briquettes in center did not fuse |
| 574 | 5.4 | 2126 | 6.2 | 2322 | 13.8 | 2581 | 25.4 | Oxy-fuel burner | 100% NRI, due to extended times in Zones I and II? |
| 591 | 5.4 | 2109 | 6.2 | 2345 | 12.5 | 2577 | 24.1 | Oxy-fuel burner | 100% NRI? Furnace failure at end of run, to repeat test |

TABLE 2

Linear Hearth Furnace Test Run Log, Alternate Cover Materials

| LHF # | Zone I Time (min) | Zone I Temp (F.) | Zone II Time (min) | Zone II Temp (F.) | Zone III Time (min) | Zone III Temp (F.) | FXT Total Time | Burners | Comments |
|---|---|---|---|---|---|---|---|---|---|
| Anthracite cover, 1.1 #/square foot | | | | | | | | | |
| 575 | 5.4 | 2030 | 6.2 | 2252 | 17.2 | 2586 | 28.8 | Oxy-fuel burner | 100% NRI |
| 576 | 5.4 | 2128 | 6.2 | 2278 | 13.8 | 2572 | 25.4 | Oxy-fuel burner | 75% NRI, center of tray did not fuse |
| Jim Walker coal cover, 0.9 #/square foot | | | | | | | | | |
| 577 | 5.4 | 2002 | 6.2 | 2282 | 17.2 | 2576 | 28.8 | Oxy-fuel burner | Partial fusion, coal cover layer partly fused |
| PRB cover layer, 0.7 #/square foot | | | | | | | | | |
| 578 | 5.4 | 2061 | 6.2 | 2360 | 17.2 | 2586 | 28.8 | Oxy-fuel burner | 100% NRI |
| 579 | 5.4 | 2025 | 6.2 | 2336 | 14.1 | 2582 | 25.7 | Oxy-fuel burner | 100% NRI |
| 581 | 5.4 | 2182 | 6.2 | 2241 | 11.5 | 2568 | 23.1 | Oxy-fuel burner | 98% NRI |
| 582 | 5.4 | 1820 | 6.2 | 2325 | 16.9 | 2574 | 28.5 | Oxy-fuel burner | 100% NRI on ½" Hearth Layer |
| 583 | 5.4 | 1915 | 6.2 | 2304 | 14.3 | 2578 | 25.9 | Oxy-fuel burner | 100% NRI on ½" Hearth Layer |
| 584 | 5.4 | 1945 | 6.2 | 2319 | 13.3 | 2558 | 24.9 | Oxy-fuel burner | Komerak partly fused, most DRI, Conway only made DRI |

TABLE 3

Compilation of tests with Komarek briquettes that made 100% NRI

| LHF # | Zone I Time (min) | Zone I Temp (F.) | Zone II Time (min) | Zone II Temp (F.) | Zone III Time (min) | Zone III Temp (F.) | FXT Total Time | Burners | Comments |
|---|---|---|---|---|---|---|---|---|---|
| Coke cover layer, 0.8 #/square foot | | | | | | | | | |
| 546 | 8.1 | 1637 | 9.3 | 2277 | 19.7 | 2561 | 37.1 | Air-fuel burner | 100% NRI |
| 547 | 8.1 | 1865 | 9.3 | 2259 | 19.7 | 2541 | 37.1 | Oxy-fuel burner | 100% NRI |
| 552 | 4.5 | 1923 | 5.2 | 2262 | 23.0 | 2562 | 32.7 | Oxy-fuel burner | 100% NRI (Air-Burners) |
| 557 | 4.5 | 1931 | 5.2 | 2345 | 23.0 | 2558 | 32.7 | Oxy-fuel burner | 100% NRI |
| 568 | 4.5 | 1648 | 7.8 | 2336 | 17.2 | 2577 | 29.5 | Oxy-fuel burner | 100% NRI |
| 564 | 4.5 | 1535 | 9.3 | 2282 | 13.8 | 2555 | 27.6 | Oxy-fuel burner | 100% NRI, extended time in Zone II |
| 559 | 4.5 | 2024 | 5.2 | 2345 | 17.2 | 2572 | 26.9 | Oxy-fuel burner | 100% NRI |
| 560 | 4.5 | 2080 | 5.2 | 2356 | 13.8 | 2582 | 23.5 | Oxy-fuel burner | 100% NRI, Outer Conway only made DRI |
| 591 | 5.4 | 2109 | 6.2 | 2345 | 12.5 | 2577 | 24.1 | Oxy-fuel burner | 100% NRI? Furnace failure at end of run, need to repeat test |
| Ave* | 4.7 | 1937 | 6.5 | 2332 | 14 | 2572 | 25.5 | Oxy-fuel burner | *Average of last 4 tests |
| Anthracite cover, 1.1 #/square foot | | | | | | | | | |
| 575 | 5.4 | 2030 | 6.2 | 2252 | 17.2 | 2586 | 28.8 | Oxy-fuel burner | 100% NRI |
| PRB cover layer, 0.7 #/square foot | | | | | | | | | |
| 578 | 5.4 | 2061 | 6.2 | 2360 | 17.2 | 2586 | 28.8 | Oxy-fuel burner | 100% NRI |
| 579 | 5.4 | 2025 | 6.2 | 2336 | 14.1 | 2582 | 25.7 | Oxy-fuel burner | 100% NRI |
| 582 | 5.4 | 1820 | 6.2 | 2325 | 16.9 | 2574 | 28.5 | Oxy-fuel burner | 100% NRI on ½" Hearth Layer, 100% NRI on 1" Hearth Layer |
| 583 | 5.4 | 1915 | 6.2 | 2304 | 14.3 | 2578 | 25.9 | Oxy-fuel burner | 100% NRI on ½" Hearth Layer, No NRI on 1" Hearth Layer |

Referring now to Tables 1 through 3, experimental data collected in a test furnace are provided. Unless otherwise stated, the tests shown in Table 1 were run having a ½ inch thick hearth material layer 44 of coke. The reducible material 46 was formed into briquettes, which were provided above the hearth material layer in a single layer of briquettes. The coarse carbonaceous layer 49 was coke provided at 0.8 lb./ft$^2$. The conversion zone 13 was divided into two zones, zone I and zone II for purposes of data collection. The fusion zone 14 was tabulated as zone III. In TABLE 1, all of the tests were run using briquettes formed on a Komarek briquetter and with a coke cover layer. The shielding entry system 39 provided was similar to that shown in FIG. 3 and described above in relation thereto.

In TABLE 2, the data collected included providing an overlayer 49 that contained volatiles to fluidize and enhance fusion and slag separation by releasing additional thermal energy in the fusion zone. The coarse carbonaceous overlayer assists in reducing $CO_2$ levels and gas turbulence adjacent the at least partially reduced iron, and allows delivery of high volatile coal, such as PRB coal, to the fusion zone, inhibiting reoxidation and decarburization of the iron to FeO and decarburization of the metallic iron nodules.

Tests from TABLES 1 and 2 that produced about 100% metallic iron nodules are shown in TABLE 3. Based on the test data shown in TABLES 1 through 3, by providing a coarse carbonaceous material as discussed above, the process time may be shortened by between about 15 to 30 percent. Additionally, introducing the coarse carbonaceous material in and near the fusion zone 14 means that the process is more effective by consuming less carbon and produce less $CO_2$ in the process.

With addition of a cover layer at the beginning of the process prior to heating caused most of the volatiles from the carbonaceous material to fluidized and be consumed before the partially reduced reducible iron bearing material reaches the fusion zone. To maintain a high bed temperature, it was necessary to react carbon directly or rely on secondary CO generated by the Boudouard reaction. In either case the $CO:CO_2$ ratio adjacent the at least partially reduced reducible material was relatively low, enabling reoxidation of the iron to FeO and gaseous decarburization of the iron and metallic iron nodules.

The presently disclosed method provides the overlayer to reduce the $CO_2$ gas and improve the $CO:CO_2$ ratio adjacent the at least partially reduced reducible material and inhibiting reoxidation of the iron to FeO and decarburization of the iron and metallic iron nodules.

This invention has been described with reference to illustrative embodiments and is not meant to be construed in a limiting sense. It will be apparent to one skilled in the art that elements or process steps from one or more embodiments described herein may be used in combination with elements or process steps from one or more other embodiments described herein, and that the present invention is not limited to the specific embodiments provided herein but only as set forth in the accompanying claims. Various modifications of the illustrative embodiments, as well as additional embodiments to the invention will be apparent to persons skilled in the art upon reference to this description.

What is claimed is:

1. A method for producing metallic iron nodules comprising the steps of:
   providing a hearth material layer comprising at least carbonaceous material on a refractory hearth in a traveling hearth furnace,
   providing at least one layer of reducible material comprising at least reducing material and reducible iron bearing material arranged in a plurality of discrete compacts over at least a portion of the hearth material layer,
   heating the reducible material in a drying/heating atmosphere and then in a reducing atmosphere to at least partially reduce the reducible iron bearing material,
   assembling a shielding entry system to introduce coarse carbonaceous material greater than 6 mesh in particle size into the furnace atmosphere in at least one location such that the temperature of the furnace atmosphere adjacent the at least partially reduced reducible iron bearing material is between about 2200 and 2650° F. (about 1200 and 1450° C.), the shielding entry system adapted to inhibit emission of infrared radiation from the furnace atmosphere and seal the furnace atmosphere from exterior atmosphere while introducing coarse carbonaceous material greater than 6 mesh into an upper portion of the furnace to be distributed over the at least partially reduced reducible iron bearing material,
   introducing a coarse carbonaceous material of greater than 6 mesh in particle size through the shielding entry system into the upper portion of the furnace, and
   heating the at least partially reduced reducible iron bearing material in a fusion atmosphere to form from the at least partially reduced reducible iron bearing material one or more metallic iron nodules and slag with the coarse carbonaceous material to assist in fusion and inhibit reoxidation of the reduced material during fusion.

2. A method for producing metallic iron nodules as claimed in claim 1 where the coarse carbonaceous material introduced into the furnace atmosphere has a particle size between 6 mesh and ½ inch.

3. A method for producing metallic iron nodules as claimed in claim 2 where the coarse carbonaceous material introduced into the furnace atmosphere has a particle size between 4 mesh and ½ inch.

4. A method for producing metallic iron nodules as claimed in claim 1 where the shielding entry system is assembled to permit introduction coarse carbonaceous material greater than 6 mesh in particle size into the furnace atmosphere at multiple locations such that the temperature of the furnace atmosphere adjacent the at least partially reduced reducible iron bearing material is between 2200 and 2400° F., (about 1200 and 1315° C.) at each location, and the coarse carbonaceous material of greater than 6 mesh in particle size is introduced into the furnace atmosphere through the shielding entry system into the upper portion of the furnace at more than one location along the furnace.

5. A method for producing metallic iron nodules as claimed in claim 4 where the coarse carbonaceous material introduced into the furnace atmosphere has a particle size between 6 mesh and ½ inch.

6. The method for producing metallic iron nodules as claimed in claim 1 where the shielding entry system is assembled with at least one stepped labyrinth no more than 6 inches wide in the direction of movement of the at least partially reduced reducible iron bearing material through the furnace such that the emission of infrared radiation from the furnace atmosphere is inhibited.

7. The method for producing metallic iron nodules as claimed in claim 1 where the shielding entry system is a pellet ladder no more than 2 inches wide in the direction of movement of the at least partially reduced the reducible iron bearing material through the furnace to inhibit emission of infrared radiation from the furnace atmosphere.

8. The method for producing metallic iron nodules as claimed in claim 1 where the step of assembling the shielding entry system comprises a seal against substantial egress of furnace atmosphere to the exterior atmosphere.

9. The method for producing metallic iron nodules as claimed in claim 1 where the assembled shielding entry system comprises a feed mechanism adapted to facilitate distribution of the coarse carbonaceous material over at the least partially reduced reducible iron bearing material.

10. The method for producing metallic iron nodules as claimed in claim 9 where the step of assembling the shielding entry system comprises introducing a carrier gas in the shielding entry system to facilitate distribution of the coarse carbonaceous material over the at least partially reduced reducible iron bearing material.

11. The method for producing metallic iron nodules as claimed in claim 9 further comprising the step of:
    elutriating carbonaceous material with a carrier gas selected from the group consisting of nitrogen, carbon dioxide, carbon monoxide, recycled furnace gas, and mixtures thereof in the shielding entry system.

12. The method for producing metallic iron nodules as claimed in claim 11 where an amount of oxygen in the gas is less than the stoichiometric amount for oxidation of the coarse carbonaceous material.

13. The method for producing metallic iron nodules as claimed in claim 1 where the assembled shielding entry system is slanted to deliver the coarse carbonaceous material over the at least partially reduced reducible iron bearing material in the direction of flow of atmosphere in the furnace.

14. The method for producing metallic iron nodules as claimed in claim 1 where the assembled shielding entry system is slanted to deliver coarse carbonaceous material over the at least partially reduced reducible iron bearing material in the direction of the at least partially reduced reducible iron bearing material in the furnace.

15. The method for producing metallic iron nodules as claimed in claim 1 where the carbonaceous material is introduced at a temperature between about 2300° F. and 2500° F. (1260 and 1370° C.).

16. The method for producing metallic iron nodules as claimed in claim 1 where carbonaceous material is selected from the group consisting of anthracite coal, bituminous coal, sub-bituminous coal, coke, char, and mixtures of two or more thereof.

17. The method for producing metallic iron nodules as claimed in claim 1 where the carbonaceous material is introduced to form a layer over the at least partially reduced reducible iron bearing material.

18. The method for producing metallic iron nodules as claimed in claim 17 where coverage of the coarse carbonaceous material is between about 0.25 lb/ft2 (1.22 kg/m2) and about 1.25 lb/ft2 (6.10 kg/m2).

19. The method for producing metallic iron nodules as claimed in claim 1 where the coarse carbonaceous material is introduced at a rate corresponding to between about 0.25 lb/ft2 (1.22 kg/m2) and about 1.25 lb/ft2 (6.10 kg/m2).

20. The method for producing metallic iron nodules as claimed in claim 1 where the coarse carbonaceous material is sub-bituminous coal introduced at a rate corresponding to between about 0.5 lb/ft2 (2.44 kg/m2) and about 1.25 lb/ft2 (6.10 kg/m2).

21. The method for producing metallic iron nodules as claimed in claim 1 where the steps are performed in a linear hearth furnace.

22. The method for producing metallic iron nodules as claimed in claim 1 where the steps are performed in a rotary hearth furnace.

23. A method for producing metallic iron nodules comprising the steps of:
   providing a hearth material layer comprising at least carbonaceous material on a refractory hearth in a traveling hearth furnace,
   providing at least one layer of reducible material comprising at least reducing material and reducible iron bearing material arranged in a plurality of discrete compacts over at least a portion of the hearth material layer,
   heating the reducible material in a drying/heating atmosphere and then in a reducing atmosphere to at least partially reduce the reducible iron bearing material,
   assembling a shielding entry system into the furnace adjacent to introduce coarse carbonaceous material greater the 6 mesh into the furnace atmosphere at a temperature about 2200 and 2650° F. (1200 and 1450° C.), the shielding entry system being adapted to inhibit emission of infrared radiation from the furnace atmosphere and sealing the fusion atmosphere from exterior atmosphere while being adapted to guide coarse carbonaceous material having a particle size between 6 mesh to within about six (6) inches above and over the at least partially reduced reducible iron bearing material in the furnace, and
   introducing a coarse carbonaceous material having particle size between 6 mesh through the shielding entry system and distributing the coarse carbonaceous material over the at least partially reduced reducible material,
   heating the at least partially reduced reducible iron bearing material in a fusion atmosphere to form from the at least partially reduced reducible iron bearing material one or more metallic iron nodules with the coarse carbonaceous material assisting fusion and inhibiting reoxidation of the reduced material.

24. The method for producing metallic iron nodules as claimed in claim 23 where the assembled shielding entry system comprises a stepped labyrinth no more than 6 inches wide in the direction of movement of the heated reducible material through the furnace.

25. The method for producing metallic iron nodules as claimed in claim 23 where the assembled shielding entry system comprises a pellet ladder no more than 2 inches wide in the direction of movement of the at least partially reduced reducible iron bearing material through the furnace.

26. The method for producing metallic iron nodules as claimed in claim 23 where the assembled shielding entry system seals against substantial egress of furnace atmosphere to the exterior atmosphere.

27. The method for producing metallic iron nodules as claimed in claim 23 where the assembled shielding entry system comprises a feed mechanism adapted to facilitate distribution of coarse carbonaceous material over the at least partially reduced reducible iron bearing material.

28. The method for producing metallic iron nodules as claimed in claim 23 comprising the additional step of introducing a carrier gas through the shielding entry system to facilitate distribution of the coarse carbonaceous material over the at least partially reduced reducible material.

29. The method for producing metallic iron nodules as claimed in claim 23 where the assembled shielding entry system is substantially vertical.

30. The method for producing metallic iron nodules as claimed in claim 23 further comprising the step of:
   elutriating in the shielding entry system the coarse carbonaceous material with a carrier gas selected from the group consisting of nitrogen, carbon dioxide, carbon monoxide, recycled furnace gas, and mixtures thereof to facilitate distribution of the coarse carbonaceous material over the at least partially reduced reducible material.

31. The method for producing metallic iron nodules as claimed in claim 30 where an amount of oxygen in the gas is less than the stoichiometric amount for oxidation of the coarse carbonaceous material.

32. The method for producing metallic iron nodules as claimed in claim 23 where the assembled shielding entry system is slanted to delivery of the coarse carbonaceous material over the at least partially reduced reducible iron bearing material in the direction of flow of atmosphere in the furnace.

33. The method for producing metallic iron nodules as claimed in claim 23 where the shielding entry system is slanted to delivery of coarse carbonaceous material over the at least partially reduced reducible iron bearing material in the direction of the at least partially reduced reducible iron bearing material in the furnace.

34. The method for producing metallic iron nodules as claimed in claim 23 where the carbonaceous material is introduced at a temperature between about 2200° F. and 2550° F. (1200 and 1450° C.).

35. The method for producing metallic iron nodules as claimed in claim 23 where carbonaceous material is selected from the group consisting of anthracite coal, bituminous coal, sub-bituminous coal, coke, char, and mixtures of two or more thereof.

36. The method for producing metallic iron nodules as claimed in claim 23 where the carbonaceous material is introduced to form a layer over the at least partially reduced reducible material.

37. The method for producing metallic iron nodules as claimed in claim 36 where the introduction of the coarse carbonaceous material through the shielding entry system is at a rate between about 0.25 lb/ft2 (1.22 kg/m2) and about 1.25 lb/ft2 (6.10 kg/m2).

38. The method for producing metallic iron nodules as claimed in claim 36 where the assembled shielding entry system is adapted to guide the coarse carbonaceous material to within about three (3) inches of the at least partially reduced reducible material.

39. The method for producing metallic iron nodules as claimed in claim 23 where the carbonaceous material is sub-bituminous coal introduced at a rate corresponding to between about 0.5 lb/ft2 (2.44 kg/m2) and about 1.25 lb/ft2 (6.10 kg/m2).

40. The method for producing metallic iron nodules as claimed in claim 23 where the steps are performed in a linear hearth furnace.

41. The method for producing metallic iron nodules as claimed in claim 23 where the steps are performed in a rotary hearth furnace.

42. The method for producing metallic iron nodules as claimed in claim 23 where the assembled shielding entry system comprises roof or wall lances or both.

43. A method for producing metallic iron nodules comprising the steps of:
providing a hearth material layer comprising a plurality of carbonaceous material layers on a refractory hearth in a traveling hearth furnace, the hearth material layer comprising a layer of undevolatized coal and a layer of devolatilized carbonaceous material over the coal,
providing at least one layer of reducible material comprising at least reducing material and reducible iron bearing material arranged in a plurality of discrete compacts over at least a portion of the hearth material layer,
heating the reducible material in a drying/heating atmosphere and then in a reducing atmosphere to at least partially reduce the reducible iron bearing material, and
heating the at least partially reduced reducible iron bearing material in a fusion atmosphere to form from the at least partially reduced reducible iron bearing material one or more metallic iron nodules.

44. The method for producing metallic iron nodules as claimed in claim 43, where the undevolatized coal in the hearth material layer is selected from the group consisting of anthracite coal, bituminous coal, sub-bituminous coal, and mixtures thereof.

45. The method for producing metallic iron nodules as claimed in claim 43, where the devolatilized carbonaceous material in the hearth material layer is char material or coke.

46. The method for producing metallic iron nodules as claimed in claim 43, where the devolatilized carbonaceous material in the hearth material layer is carbonaceous material removed from the hearth at the exit end of the furnace.

47. The method for producing metallic iron nodules as claimed in claim 43, further comprising:
assembling a shielding entry system to introduce coarse carbonaceous material greater than 6 mesh in particle size into the furnace atmosphere in at least one location such that the temperature of the furnace atmosphere adjacent the at least partially reduced reducible iron bearing material is between about 2200 and 2650° F. (about 1200 and 1450° C.), the shielding entry system adapted to inhibit emission of infrared radiation from the furnace atmosphere and seal the furnace atmosphere from exterior atmosphere while introducing coarse carbonaceous material greater than 6 mesh into an upper portion of the furnace to be distributed over the at least partially reduced reducible iron bearing material, and
introducing a coarse carbonaceous material of greater than 6 mesh in particle size through the shielding entry system into the upper portion of the furnace.

* * * * *

UNITED STATES PATENT AND TRADEMARK OFFICE
CERTIFICATE OF CORRECTION

| | | |
|---|---|---|
| PATENT NO. | : 8,021,460 B2 | Page 1 of 1 |
| APPLICATION NO. | : 12/569176 | |
| DATED | : September 20, 2011 | |
| INVENTOR(S) | : Rodney Bleifuss et al. | |

It is certified that error appears in the above-identified patent and that said Letters Patent is hereby corrected as shown below:

In the Specification:
Column 1, lines 17-21
   delete "The present invention was made with support by the Department of Energy, Sponsor Award DE-FG36-05GO15185, and with support by the Economic Development Administration, Grant No. 06-69-04501. The United States government may have certain rights in the invention."
   insert -- This invention was made with government support under Sponsor Award DE-FG36-05GO15185 awarded by the Department of Energy, and Grant No. 06-69-04501 awarded by the Economic Development Administration. The government has certain rights in the invention. --

Signed and Sealed this
Seventeenth Day of June, 2014

Michelle K. Lee
*Deputy Director of the United States Patent and Trademark Office*